(12) United States Patent
LaPine et al.

(10) Patent No.: US 9,674,123 B2
(45) Date of Patent: Jun. 6, 2017

(54) SYSTEM AND METHOD FOR MESSAGE DISPATCHING AND COMMUNICATION

(71) Applicant: SEMOTUS INC., Los Gatos, CA (US)

(72) Inventors: Anthony LaPine, Los Gatos, CA (US); Pamela LaPine, Los Gatos, CA (US)

(73) Assignee: SEMOTUS INC., Los Gatos, CA (US)

( * ) Notice: Subject to any disclaimer, the term of this patent is extended or adjusted under 35 U.S.C. 154(b) by 210 days.

(21) Appl. No.: 14/569,605

(22) Filed: Dec. 12, 2014

(65) Prior Publication Data
US 2015/0100628 A1   Apr. 9, 2015

Related U.S. Application Data

(63) Continuation-in-part of application No. 13/792,802, filed on Mar. 11, 2013, now Pat. No. 9,014,350.
(Continued)

(51) Int. Cl.
*H04M 11/00* (2006.01)
*H04L 12/58* (2006.01)
(Continued)

(52) U.S. Cl.
CPC ...... *H04L 51/066* (2013.01); *G06F 17/30424* (2013.01); *H04L 51/36* (2013.01);
(Continued)

(58) Field of Classification Search
CPC ... H04M 2203/4509; H04M 2203/253; H04M 2203/4536; H04M 3/53; H04M 2201/22; H04M 2201/60; H04M 7/0051; H04M 7/0054; H04M 1/72522; H04M 1/72547; H04M 2201/38; H04M 2201/40; H04M 2203/1016; H04M 2203/105; H04M 2203/353; H04M 1/274516; H04M 15/59; H04M 1/2535; H04M 1/72558; H04M 3/42382; H04M 3/5315; H04M 1/72519; H04M 1/72536; H04M 1/72552; H04M 1/72572; H04M 1/72583; H04M 2203/10; H04M 7/0021; H04M 1/2473; H04M 3/5166; H04M 3/5235; H04M 2203/401;
(Continued)

(56) References Cited

U.S. PATENT DOCUMENTS

| | | | |
|---|---|---|---|
| 8,433,808 B1 * | 4/2013 | Hong | H04L 67/02 709/228 |
| 2005/0259645 A1 * | 11/2005 | Chen | H04L 29/12066 370/389 |

(Continued)

*Primary Examiner* — Akelaw Teshale
(74) *Attorney, Agent, or Firm* — Galvin Patent Law LLC; Brian R. Galvin

(57) ABSTRACT

A system for secure delivery of messages over disparate networks with disparate protocols, comprising a server computer comprising program code stored in a memory and adapted to manage message delivery received from at least one accredited client computing device, the server computer having at least a plurality of special TCP sockets allowing a plurality of persistent connections, the connections being adapted to deliver messages under different carrier protocols, using at least one of SNPP, WCTP, SMTP, CAP, and OAI carrier types protocols, and the connections being adapted to facilitate the sending of multiple messages in a short time.

6 Claims, 17 Drawing Sheets

Related U.S. Application Data

(60) Provisional application No. 61/609,982, filed on Mar. 13, 2012.

(51) Int. Cl.
*H04L 29/06* (2006.01)
*G06F 17/30* (2006.01)
*H04M 3/51* (2006.01)
*H04M 3/533* (2006.01)
*H04M 7/12* (2006.01)

(52) U.S. Cl.
CPC .......... *H04L 67/42* (2013.01); *H04M 3/5158* (2013.01); *H04M 3/53366* (2013.01); *H04M 7/129* (2013.01); *H04M 2203/2011* (2013.01); *H04M 2203/2027* (2013.01)

(58) Field of Classification Search
CPC .... H04M 3/5175; H04M 3/5183; H04M 3/00; H04M 3/4936; H04M 5/00; H04M 15/00; H04M 7/003; H04M 15/90; H04M 2201/39; H04M 2201/54; H04M 2203/05
USPC ...... 379/88.13, 220.01, 88.17, 88.11, 39, 40, 379/41, 42, 43, 44, 51, 75, 88.01, 88.1, 379/88.14, 88.22, 88.18, 93.01, 221.08, 379/265.09, 142.04, 201.01, 265.02, 379/265.07, 265.13, 266.01, 266.02, 379/266.08, 74, 78, 82, 88.02
See application file for complete search history.

(56) References Cited

U.S. PATENT DOCUMENTS

| | | | |
|---|---|---|---|
| 2006/0182085 A1* | 8/2006 | Sweeney | G06Q 10/087 370/352 |
| 2012/0096263 A1* | 4/2012 | Shi | H04W 12/02 713/168 |
| 2013/0031268 A1* | 1/2013 | Pope | H04L 69/166 709/237 |
| 2013/0044599 A1* | 2/2013 | Cherian | H04L 47/2433 370/235 |
| 2013/0085771 A1* | 4/2013 | Ghanbari | G06Q 10/103 705/2 |
| 2013/0113608 A1* | 5/2013 | Subramanian | H04L 41/0823 340/10.1 |

* cited by examiner

| HOST | PORT | PROTOCOL | TYPE | REMOTE | PURPOSE |
|---|---|---|---|---|---|
| HipLink Server | 10000 (default) | TCP | Inbound ↓ | Mobile App | HNP communication between system server, and mobile apps. Port can be changed. |
| HipLink Server | (any port) | TCP | Inbound ↓ | Mobile App | HNP communication between system server, and mobile apps, exclusively for file transfer. Port can be changed. |
| HipLink Server | 2195 | TCP | Outound ↑ | APNS Gateway | Push notification handoff to APNS Gateway, either to gateway.sandbox.push.apple.com, or gateway.push.apple.com. |
| Mobile App | 5223 | TCP | Outound ↑ | APNS Gateway | iOS device persistent connection to APNS Gateway to register, and receive push notification. |
| Mobile App | 443 | TCP | Outound ↑ | APNS Gateway | iOS device persistent connection to APNS Gateway to register, and receive push notification if 5223-outbound is inaccessible. |

Fig. 3

SYSTEM AND METHOD FOR MESSAGE DISPATCHING AND COMMUNICATION

CROSS REFERENCE TO RELATED APPLICATIONS

This application is a continuation-in-part of U.S. patent application Ser. No. 13/792,802, titled "METHOD FOR PROVIDING A BEACON TO ENSURE DELIVERY OF AUTOMATED MESSAGES OVER A TELEPHONE OR VOICE MESSAGING SYSTEM", which was filed on Mar. 11, 2013, which claims priority to expired U.S. provisional patent application Ser. No. 61/609,982, titled "METHOD FOR PROVIDING A BEACON TO ENSURE DELIVERY OF AUTOMATED MESSAGES OVER A TELEPHONE OR VOICE MESSAGING SYSTEM," which was filed on Mar. 13, 2012, the entire specification of each of which is incorporated herein by reference.

BACKGROUND OF THE INVENTION

The workplace continues to move at an increasingly faster pace requiring real-time response and access, as well as secure text messaging. Smartphones can help bridge the technology gap for mobile employees as well as those that are just away from their desk or need to respond after-hours.

Traditional Mobile Notification services depends heavily on the carrier, and hence often hit by the carrier coverage limitations, and their communication cost. More over these notification solutions provide basic (rudimentary) functions with severe lacking in support for content security, content type, and content size. Also there are no or limited two-way workflow support. Along with that, the communication is not real-time, and often unreliable.

Many applications, including public safety and disaster recovery, require rapid response, often to tens of thousands of recipients across a broad spectrum of different carriers. Currently, no products are available to provide the necessary speed and accuracy, along with desirable customer and company benefits. Current products require multiple servers with large amounts of memory and storage. Not only does this increase the cost to the customer it adds to the customer support challenges.

Blackberry Mobile App—Development in BB10 Platform

The Blackberry 10 platform poses a number of issues around the platform's capability, support and APIs. The background processes, unlike other platforms, are developed separately from the user interface (UI) front end, but said processes need to be paired with the front end UI in a single distribution application package, and there are limitations on rendering the UI in the background app. Other challenges lie in the notification limitations between the background app and the front end app.

The BB10 client/app could be written in the C++ native platform to get the most of the BB10 APIs and features. But this choice raises certain issues, due to Blackberry's own rapidly changing APIs. One solution would be a pair of apps, comprising a front end UI app, and a background headless app. However, there are many uncertainties in communication between these two sub apps. In light of all the BB10 challenges and limitations, the app for the BB10 platform could be designed to be functionally equivalent to the native iOS™ app. Such an app would comprise different self-managed modules that can be used either in the background or foreground app, depending on the needs of the future BB10 releases. The background app could be just an augmentation of these modules, with each module using observer design patterns to send events to others. Hence the BB10 app would simply become an assembly of functional independent modules as objects that interact with others to exchange events, data, or information. Moreover, the design would use local TCP/IP sockets to implement two-way communication pathways between the sub app, thus enabling smooth asynchronous and sync-based communication channels. Thus this system would be a full messaging solution that provides support for BB10 devices. Most current systems do not support the BB10 platform simply due to its challenges and limitations, and in the others that do provides support, the apps are functionally very thin.

Next Generation UI Backend Architecture

Future solutions could be based on a true Model View Controller design pattern, with the backend composed of only web services. This approach moves on from old CGI, FastCGI backend-engines to more scalable backend platform which is web services. These web services are RESTful APIs that would be called by the frontend UI to perform any action or fetch data items. The front end would be a single page web app, with all the panels loaded dynamically, removing the page loading phenomena from the whole UI. The front end logic engine should be based on the latest, widely used JAVASCRIPT™ framework called Backbone.js, with other UI frameworks. With this design, the front end could be completely decoupled from the back end. Thus with this architecture, developers could easily change the UI theme without making any change to the back end, and vice versa, enabling UI changes more easily and with least efforts. Most current products use old Java or .Net based web UI frameworks that do not scale well with the number of users/usage, and they are not very efficient. Using C/C++ as the language and Axis2/C as the web service engine lets developers build the most fastest and most efficient back end. Also, other functions such as lazy loading, and smart URLs increases the efficiency of the whole web UI.

Dialer Service Multi-Threaded Design with Minimum Critical Sections

The speed and accuracy of reaching recipients with voice messages is essential to any mission-critical communication platform. Execution of these requirements without the overhead and complexity of dozens of costly parallel applications calls for a proprietary methodology and coding scheme. The dialer service should be a multi-thread service that comprises threads for reading jobs, preparing jobs for calls, dispatching jobs, setting up their calls, receiving call progress statuses, and making updates to the job description in the database. All these threads could share data in between, and thus logically require a locking mechanism to ensure data does not get corrupted due to simultaneous access. Locking (implementing critical sections), however, introduces a lot of inter-thread waiting, making the overall processing (divided among threads) slower. The dialer service should have data structures and code that enable simultaneous access with minimum requirements for critical sections, or with critical sections with minimum length. This approach would enable distributed voice calling processes in multiple threads with very minimum overhead.

What is needed is a product to meet customer requirements by using a small server with a consumer grade processor, a gigabyte of storage and less than 8 gigabytes of memory. Additionally needed is an application developed in different self-managed modules, so they could be used either in the background or foreground, depending on the needs of the future BB10 releases. The background app could be an augmentation of these modules, with each module using observer design pattern to send events to others. This design strategy would enable development with no loss of time due to changing platform.

SUMMARY OF THE INVENTION

The inventor has developed a suite of mobile applications that provide maximum flexibility and leverage optimum use of today's smartphones. Using inventor's Enterprise Messaging Applications, users can have a priority view of important alerts, get fully-secure text messages or have capability to send messages and execute actions remotely.

The inventor leverages their proprietary protocol HNP to work on top of TCP over live connections, completely independent of cellular SMS. The applications provide advanced messaging features for encrypted text messages, overriding phone settings for emergency messages, and one click responses in both the system's Inbox and Mobile. As a secure, easy-to manage platform, the present invention improves overall communication throughout the organization, regardless of location.

The present invention provides a cutting edge platform for enterprises that are quite unique from the other solutions. Firstly the present invention frees the customer from the carrier dependence, and adds support for communication over Internet protocol using Wi-Fi or carrier data networks. Along with it, the present invention provides complete end-to-end security of messages with support for remote administration, and device control. Above all the present invention gives real-time messaging services with backup fallback to platform specific push notification services. The present invention also enables advance messaging workflows which are now becomes the basic needs of today's Enterprises.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

FIG. 3 provides a list of all the network communications that occurs in the HipLink Mobile Notification Solution.

DETAILED DESCRIPTION OF THE INVENTION

Figure 1:
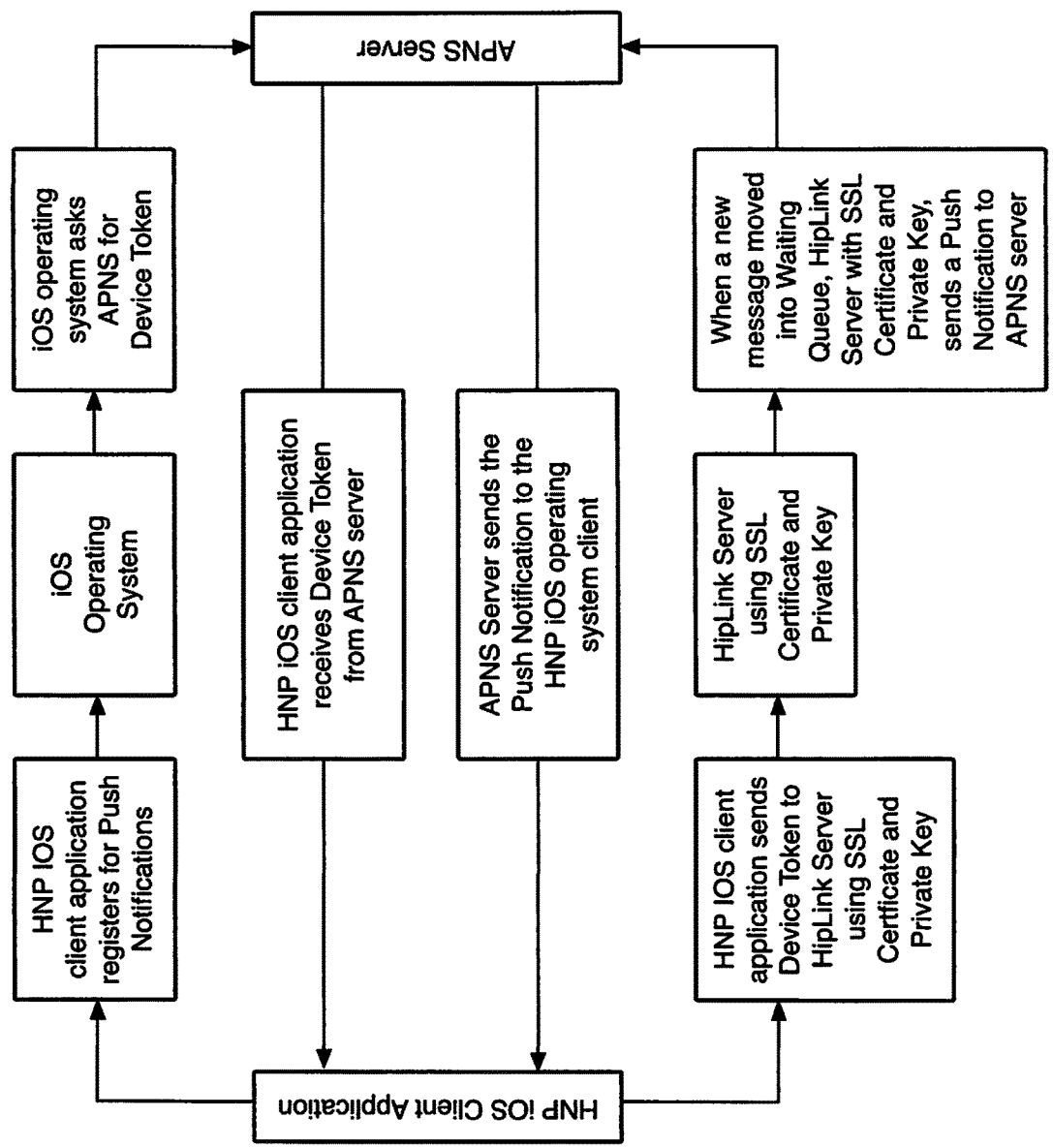
FIG. 1 illustrates the iOS™ app created with a provisioning profile enabled with APNS support.

The inventor has conceived, and reduced to practice, a suite of mobile applications that provide maximum flexibility and leverage optimum use of today's smartphones. Using inventor(s)'s Enterprise Messaging Applications Users can have a priority view of important alerts, get fully-secure text messages or have capability to send messages and execute actions remotely.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 14:
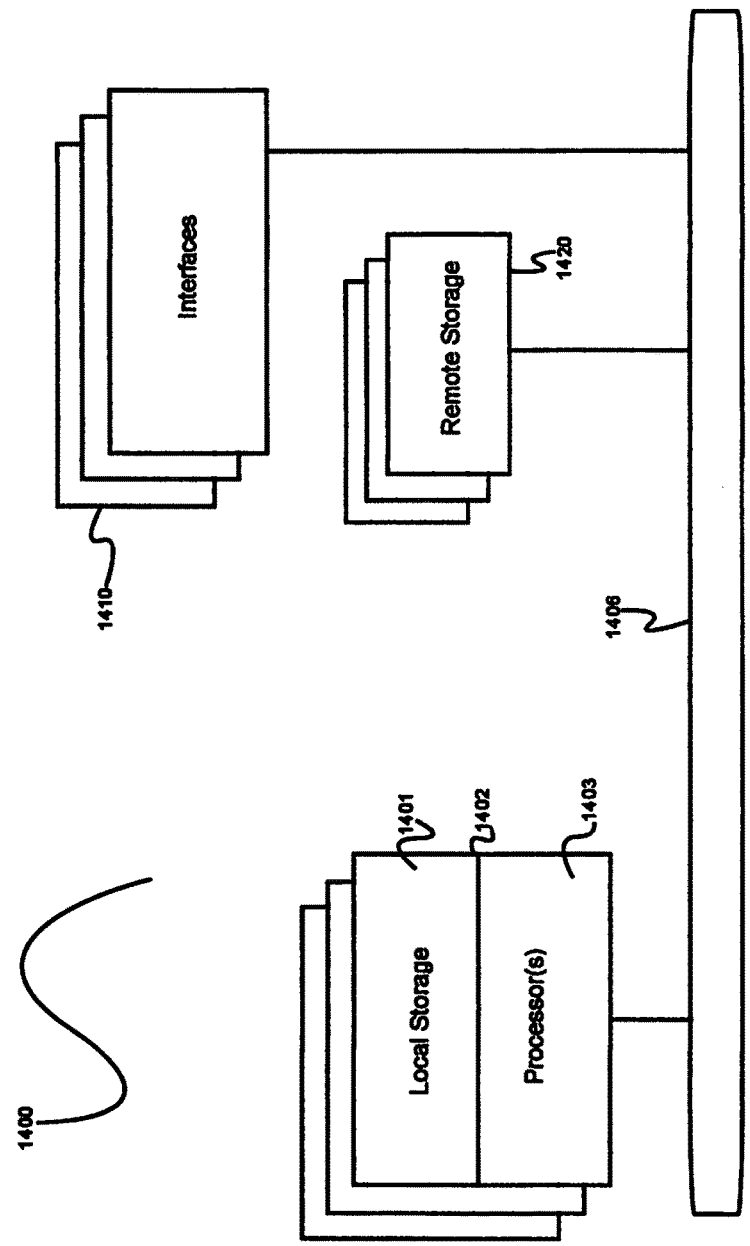
FIG. 14 is a block diagram illustrating an exemplary hardware architecture of a computing device used in an embodiment of the invention.

Referring now to FIG. 14, there is shown a block diagram depicting an exemplary computing device 1400 suitable for implementing at least a portion of the features or functionalities disclosed herein. Computing device 1400 may be, for example, any one of the computing machines listed in the previous paragraph, or indeed any other electronic device capable of executing software- or hardware-based instructions according to one or more programs stored in memory. Computing device 1400 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1400 includes one or more central processing units (CPU) 1402, one or more interfaces 1410, and one or more busses 1406 (such as a peripheral component interconnect (PCI) bus). When acting under the control of appropriate software or firmware, CPU 1402 may be responsible for implementing specific functions associated with the functions of a specifically configured computing device or machine. For example, in at least one embodiment, a computing device 1400 may be configured or designed to function as a server system utilizing CPU 1402, local memory 1401 and/or remote memory 1420, and interface(s) 1410. In at least one embodiment, CPU 1402 may be caused to perform one or more of the different types of functions and/or operations under the control of software modules or components, which for example, may include an operating system and any appropriate applications software, drivers, and the like.

CPU 1402 may include one or more processors 1403 such as, for example, a processor from one of the Intel, ARM, Qualcomm, and AMD families of microprocessors. In some embodiments, processors 1403 may include specially designed hardware such as application-specific integrated circuits (ASICs), electrically erasable programmable read-only memories (EEPROMs), field-programmable gate arrays (FPGAs), and so forth, for controlling operations of computing device 1400. In a specific embodiment, a local memory 1401 (such as non-volatile random access memory (RAM) and/or read-only memory (ROM), including for example one or more levels of cached memory) may also form part of CPU 1402. However, there are many different ways in which memory may be coupled to system 1400. Memory 1401 may be used for a variety of purposes such as, for example, caching and/or storing data, programming instructions, and the like. It should be further appreciated that CPU 1402 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 1410 are provided as network interface cards (NICs). Generally, NICs control the sending and receiving of data packets over a computer network; other types of interfaces 1410 may for example support other peripherals used with computing device 1400. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 14 illustrates one specific architecture for a computing device 1400 for implementing one or more of the inventions described herein, it is by no means the only device architecture on which at least a portion of the features and techniques described herein may be implemented. For example, architectures having one or any number of processors 1403 may be used, and such processors 1403 may be present in a single device or distributed among any number of devices. In one embodiment, a single processor 1403 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 1420 and local memory 1401) configured to store data, program instructions for the general-purpose network operations, or other information relating to the functionality of the embodiments described herein (or any combinations of the above). Program instructions may control execution of or comprise an operating system and/or one or more applications, for example. Memory 1420 or memories 1401, 1420 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
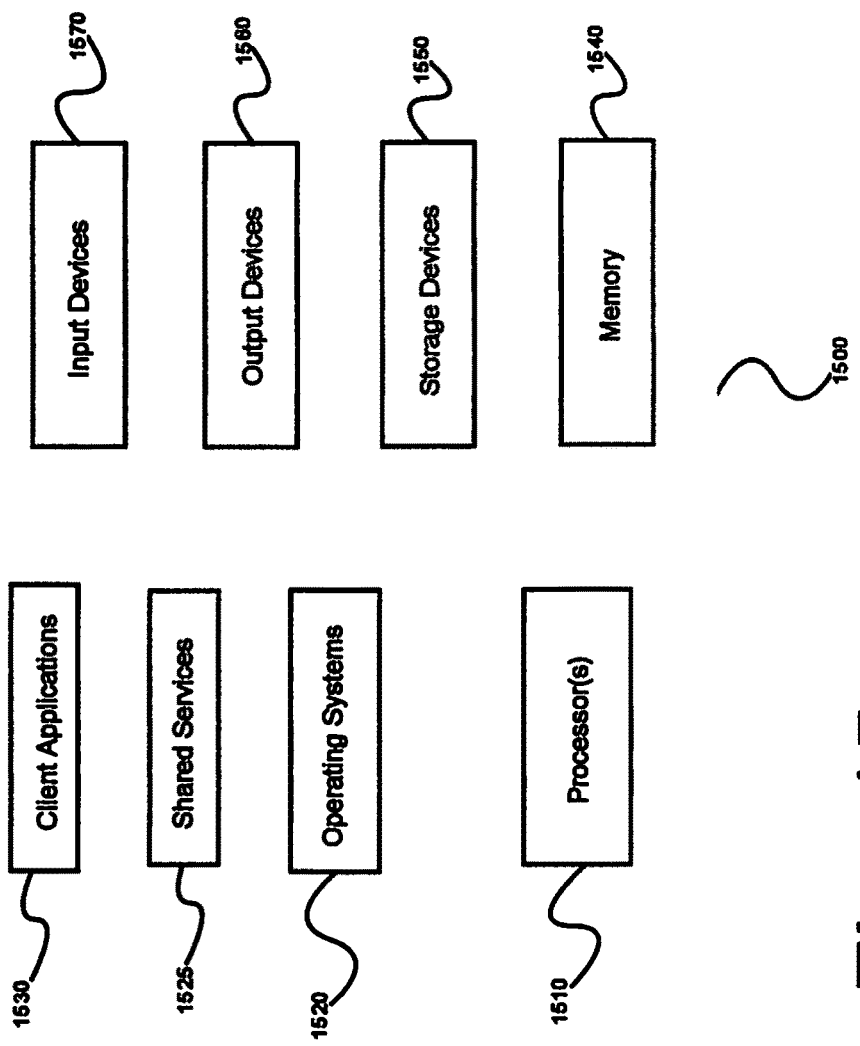
FIG. 15 is a block diagram illustrating an exemplary logical architecture for a client device, according to an embodiment of the invention.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 1500 includes processors 1510 that may run software that carry out one or more functions or applications of embodiments of the invention, such as for example a client application 1530. Processors 1510 may carry out computing instructions under control of an operating system 1520 such as, for example, a version of Microsoft's WINDOWS™ operating system, Apple's Mac OS/X or iOS™ operating systems, some variety of the Linux operating system, Google's ANDROID™ operating system, or the like. In many cases, one or more shared services 1525 may be operable in system 1500, and may be useful for providing common services to client applications 1530. Services 1525 may for example be WINDOWS™ services, user-space common services in a Linux environment, or any other type of common service architecture used with operating system 1510. Input devices 1570 may be of any type suitable for receiving user input, including for example a keyboard, touchscreen, microphone (for example, for voice input), mouse, touchpad, trackball, or any combination thereof. Output devices 1560 may be of any type suitable for providing output to one or more users, whether remote or local to system 1500, and may include for example one or more screens for visual output, speakers, printers, or any combination thereof. Memory 1540 may be random-access memory having any structure and architecture known in the art, for use by processors 1510, for example to run software. Storage devices 1550 may be any magnetic, optical, mechanical, memristor, or electrical storage device for storage of data in digital form (such as those described above, referring to FIG. 14). Examples of storage devices 1550 include flash memory, magnetic hard drive, CD-ROM, and/or the like.

Figure 16:
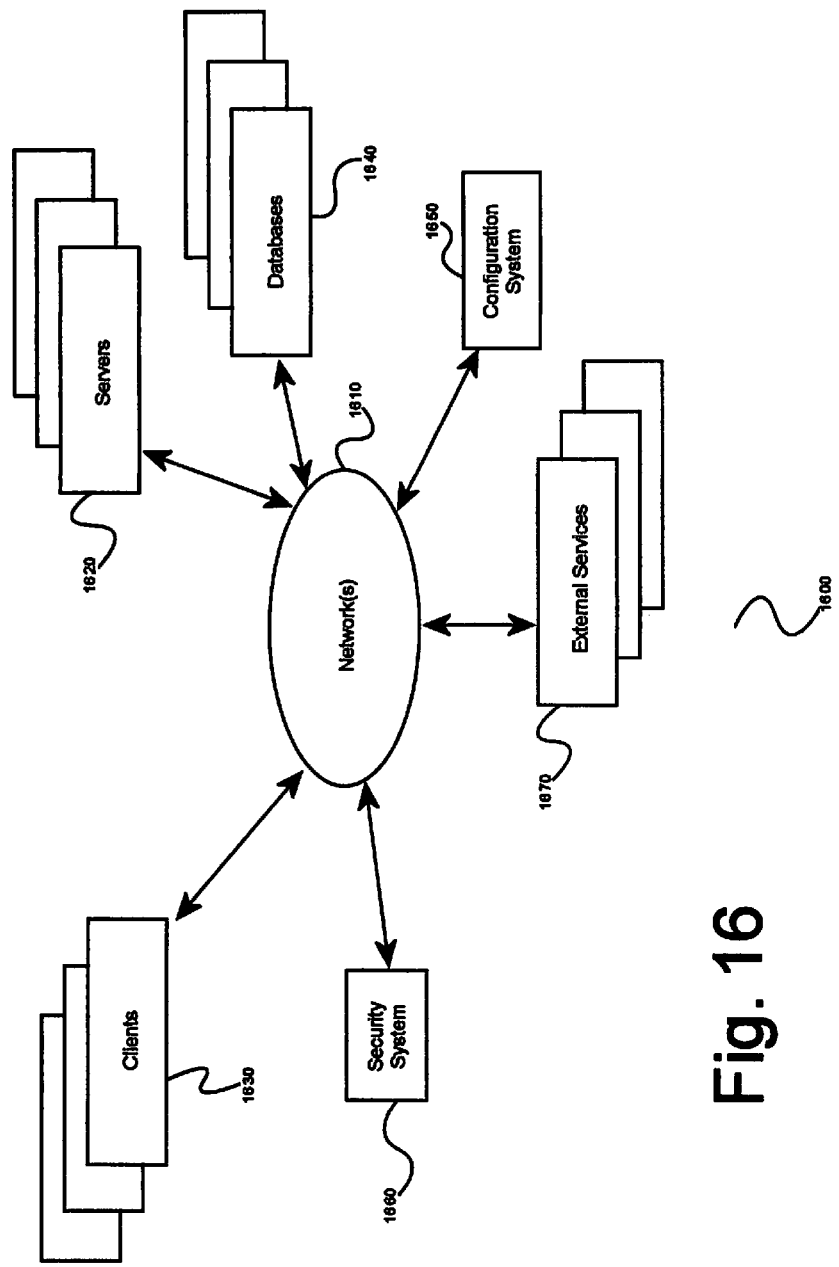
FIG. 16 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 16, there is shown a block diagram depicting an exemplary architecture 1600 for implementing at least a portion of a system according to an embodiment of the invention on a distributed computing network. According to the embodiment, any number of clients 1630 may be provided. Each client 1630 may run software for implementing client-side portions of the present invention; clients may comprise a system 1500 such as that illustrated in FIG. 15. In addition, any number of servers 1620 may be provided for handling requests received from one or more clients 1630. Clients 1630 and servers 1620 may communicate with one another via one or more electronic networks 1610, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 1610 may be implemented using any known network protocols, including for example wired and/or wireless protocols.

In addition, in some embodiments, servers 1620 may call external services 1670 when needed to obtain additional information, or to refer to additional data concerning a particular call. Communications with external services 1670 may take place, for example, via one or more networks 1610. In various embodiments, external services 1670 may comprise web-enabled services or functionality related to or installed on the hardware device itself. For example, in an embodiment where client applications 1530 are implemented on a smartphone or other electronic device, client applications 1530 may obtain information stored in a server system 1620 in the cloud or on an external service 1670 deployed on one or more of a particular enterprise's or user's premises.

In some embodiments of the invention, clients 1630 or servers 1620 (or both) may make use of one or more specialized services or appliances that may be deployed locally or remotely across one or more networks 1610. For example, one or more databases 1640 may be used or referred to by one or more embodiments of the invention. It should be understood by one having ordinary skill in the art that databases 1640 may be arranged in a wide variety of architectures and using a wide variety of data access and manipulation means. For example, in various embodiments one or more databases 1640 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 1660 and configuration systems 1650. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 1660 or configuration system 1650 or approach is specifically required by the description of any specific embodiment.

Figure 17:
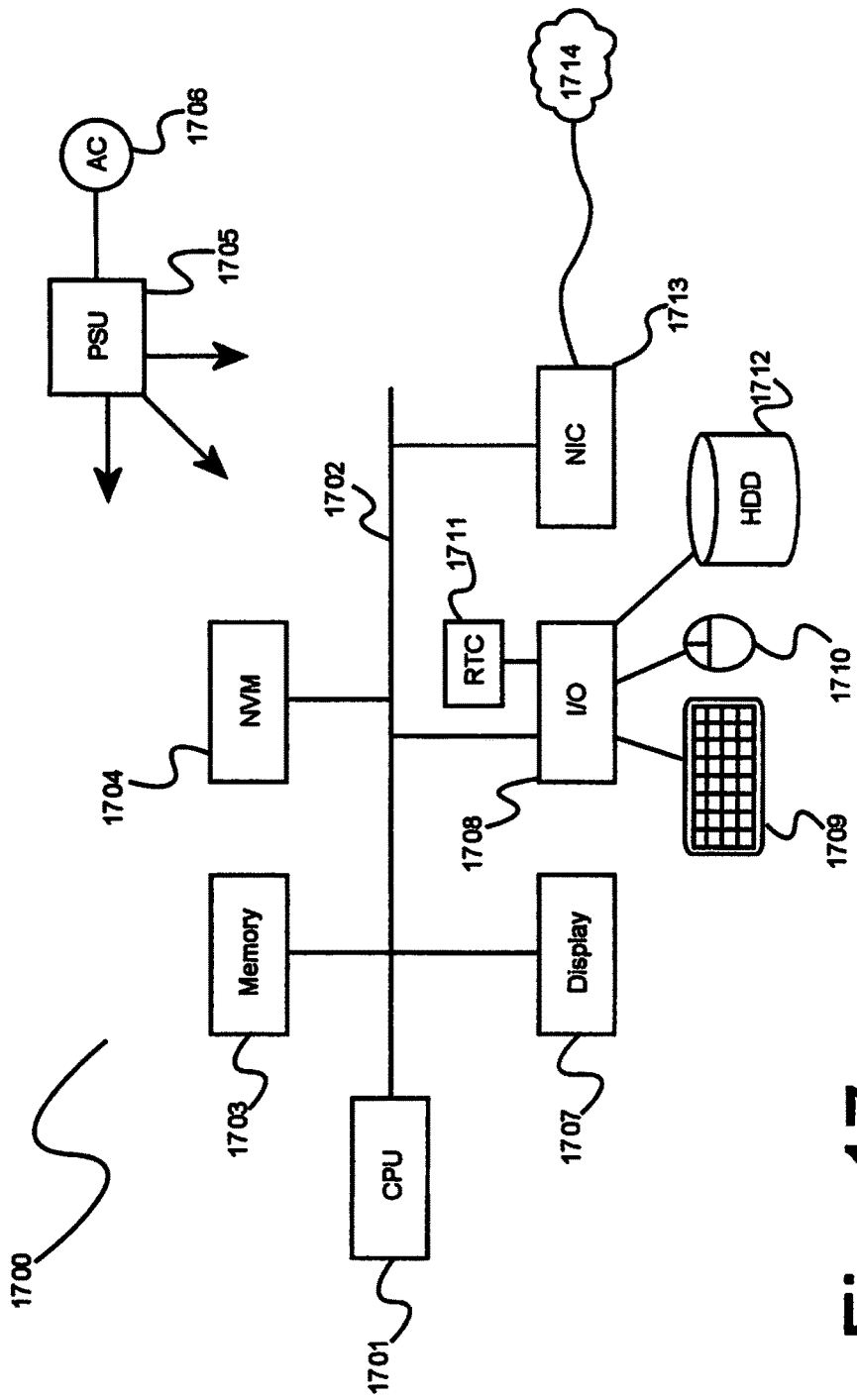
FIG. 17 is another block diagram illustrating an exemplary hardware architecture of a computing device used in various embodiments of the invention.

FIG. 17 shows an exemplary overview of a computer system 1700 as may be used in any of the various locations throughout the system. It is exemplary of any computer that may execute code to process data. Various modifications and changes may be made to computer system 1700 without departing from the broader scope of the system and method disclosed herein. CPU 1701 is connected to bus 1702, to which bus is also connected memory 1703, nonvolatile memory 1704, display 1707, I/O unit 1708, and network interface card (NIC) 1713. I/O unit 1708 may, typically, be connected to keyboard 1709, pointing device 1710, hard disk 1712, and real-time clock 1711. NIC 1713 connects to network 1714, which may be the Internet or a local network, which local network may or may not have connections to the Internet. Also shown as part of system 1700 is power supply unit 1705 connected, in this example, to ac supply 1706. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The physical apparatus required to enable one embodiment of the present invention includes a web server; a web portal interface; a multi-user network; and an application server. Thus, the method of the present invention may also be recorded onto a CD, or any other recordable medium as well as being delivered electronically from a database to a computer, wherein the method embodied by the software that is recorded is then executed by a computer for use and transformation of the Internet browser and its contents. The Mobile Notification Solution of the present invention is available for the following platforms: ANDROID MOBILES; ANDROID TABLETS; APPLE'S IPHONES/IPODS; APPLE'S IPAD; MICROSOFT WINDOWS DESKTOP; BLACKBERRY 10 MOBILES.

The same solution works on all the above mentioned platforms and enables an Enterprise to work with heterogeneous mobile devices and platforms.

The present invention provides two operational modes for the mobile app; Basic and Advance. The basic mode provides only messaging functions, whereas the advance mode gives more functions to manage and control various processes in the system server. This gives an easy way for Enterprises to manage their license cost by providing advance functions to targeted technical users.

The present invention provides mobile clients that can be easily distributed using any third party MDM (Mobile Device Management) solutions, or mobile app stores. The apps are tested to work with the today's widely used MDM solutions like MOBILEIRON.

The present invention provides admin panel on the server software through which an admin can control each and every mobile device, and its access to the information. The present invention provides an easy to define general policy through which rules can be defined for all devices. Similarly, specific rules for individual devices can also be defined, and applied instantaneously. More over mobile data can also be erased remotely.

The present invention provides full end-to-end security using the Industry accepted cryptographic algorithms, for example AES. The end-to-end security means, all communication between the present invention server and the present invention mobile apps is secured, all the messages saved on the devices are secured, and all the messages saved on the devices can be managed with automatic deletion, message expiry, and remote administration.

To ensure message confidentiality, integrity and authenticity, along with security against various attacks the present invention uses the best possible mechanism, Transport Layer Security (TLS) which is recognized as security standard in the enterprise community. TLS, the successor to SSL, offers a robust security protocol meeting IETF standards for connection security. Using TLS, the present invention smartphone apps support a wide variety of bit-rate encryption options that include 128, 196 and 256-bit AES encryption standards configurable by the administrator.

One of the more interesting features the present invention has developed by using this standard is a "single session" handshake process. By using this method, the TLS encryption key is constantly changing on each communication session between the system server and the mobile device.

This short "time to live" makes cracking the encryption extremely difficult as the key is constantly regenerating with each communication transaction. The security features apply to all phases of message delivery both messages sent to the phone and responses back.

One of the most essential aspects of the BYOD model is to remotely manage and control the data inside the employees (mobile consumer) devices. The present invention's solution provides an easy to administer, and use features to manage and control consumer's device access to corporate data both on server and on device (local).

The following actions are available to Administrators from the present invention GUI: push application settings remotely from the present invention to the device. Push application capabilities and permissions remotely from the present invention to the device. Delete all or selected data stored in the device application. Lock out access to the present invention. Define a general policy for general authorities and application settings applied to all devices.

The present invention Enterprise Mobile Notification Solution supports several advance workflows that are the need of today's organizations to carry out most of the operations. Besides the simple messaging workflow, the present invention also provides support for the following: Two-Way communication with canned response choices, Escalation messaging, Confidential messaging, Schedule messaging, Broadcasting to all, and On-Duty messaging.

Besides that, the present invention support functions to allow users to efficiently browse contact directory stored in the present invention server, and import contacts to the local favorites list. Confirm or refuse a received message to let know about their availability for the task/job. Respond to a message to let know about their opinion and choice. Forward to other users to spread the word with least efforts. Receive send message replies with recipient's opinions and choices. Send and receive media attachments with messages to share images, audios, video, office contents, etc. Send and receive location with the message to share your or see others location, for easy tracking. Send offline messages to users not available.

The present invention Enterprise Mobile Notification Solution is HIPAA (Health Insurance Portability and Accountability Act) compliant, and as per requirements, provides: Confidential data (e.g. PHI) protection in activity logs and audit trails. End-to-end secure communication between the present invention server and mobile app with AES encryption algorithm using TLS. Device level data protection with AES encryption algorithm (with 256 bit keys) to protect messages and received media content. Secure messaging workflow to enforce messaging of confidential data to only secure users, and prevent messaging to insecure users. Mobile app security to prevent access to information (messages and media content) to unintended users. Remote administration to manage and control mobile app access, and its dependent data. Ability to remove (all or selected) data on the device from remote admin console. Ability to disable mobile app from remote admin console.

The present invention Enterprise Mobile Notification Solution support messaging in (close to) real-time, where messages can be received within one second time interval after dispatch. Also all the messaging workflows are designed to be 100% deterministic, letting know the dispatcher immediately regarding the message delivery status whether it is succeeded, failed, or put on hold for later delivery. In the case of later delivery, the messages are sent (as offline messages) when the recipient gets online.

Besides that the mobile platform specific Push Notification solution can also be configured in the present invention to dispatch new message alerts to offline users, gaining their attention to come online. Right now as of this writing, the present invention only supports Apple's APNS (Apple Push Notification Service) for their iOS™ devices.

The present invention's mobile apps support always online methodology for the mobile users. Hence the apps are designed to always keep the user online for easy access to new messages in real-time. The Android app has special capability to start automatically on device reboots. The apps and their processes are design to put least amount of contribution to the device battery drain. The iPhone app is tested to give an average battery drain within 2% per hour, whereas Android app gives 3% per hour with normal operations.

The present invention server provides full audit trail for all of its communication. Any message can be trace and its dispatch status can be tracked from a single easy to follow reports panel. The Mobile app provides details reporting for each message which includes: Delivery report on message received at the mobile device. Message read report, when the user actually reads a message. Message two-way response status, when the user sends his choice/response to a message. Message confirmation/rejection status, when the user actually confirms or refuses a message.

When a message first arrives, a delivery receipt is sent back to the sender. Message recipients have the ability to actively acknowledge or ignore the message, which is then also transmitted back to the sender. In addition to acknowledgement, users can respond to a message using free-form text or templates. Responses are kept with the original message in system log files for continuity purposes.

Administrators also require a full audit trail, including the ability to run reports on the timing of message delivery and how quickly read receipts were returned from each user's smartphone. This ensures messages are read in a timely fashion and eliminates complaints from users that they didn't receive a message.

The server also provides detailed activity logs for each of its processes from where admin can actually obtains the logs entries of all the workflows and processes done in that module, and can get information and data on activities.

Key Features of the present invention Mobile include: Private inbox for all the messages send from the present invention. Separates critical messages from less important emails and text messages. Secure delivery of messages and responses. Automatic delivery receipts for messages. Active acknowledgement of message and free-form text response. Directory look-up and user authentication. Ability to initiate messages to other users from a device running the present invention Mobile app. Remote application wipe and administration. Leverages cellular and Wi-Fi networks. Supports a variety of devices to accommodate hospital-employed and independent physicians. Real-time messaging for online users, with support for offline messages. New message alerts for offline users using platform specific push notifications services. Full personalization of ring tones for message severity levels, along with other display settings. Persistent alerting for critical and emergency level message. Lock screen notification when phone is in standby mode. Silent notification on status bar for normal (least severe) messages. Multiple file attachment support (all formats). One click callback to numbers in the message body. One click text to numbers in the message body. One click to open URLs embedded in the message body in a browser. Ability to hear message and canned response choices. Ability to see location attached to messages. Ability to define message expiry. Ability to compose message by voice. Ability to define auto delete configuration to automatically delete old messages after N days.

The present invention Enterprise Mobile Notification solution only requires five (5) steps of configuration to become quickly operational. These steps are: Configuring the present invention server; Configuring mobile users; Installing client; Registering (Activating) client; and Login to the present invention server.

In an initial step 1: Configuring the present invention server, admin requires to setup HNP manager, HNP carriers and HNP messengers. After this step, solution will be ready to get connections from mobile clients, and become able to send messages to these clients.

In a next step 2: Configuring mobile users, mobile users are defined in the present invention server contacts database. Each mobile user can be associated with a the present invention server user to grant extra authorities for advance features.

In a next step 3: Installing client, the present invention mobile app on the mobile device; smartphone, tablet, or any supported media device. The installation can be over-the-air (OTA) using any MDM solution. Or it can be a manual distribution process involving install the app binary by each mobile user.

After installation, in a next step 4: Registering (Activating) client, the app is required to once get registered with the present invention server. This is a onetime process in which the app gets activated at the present invention server.

After registering the app, in a next step 5: Login to the present invention server, the user will be require to log into server. The login can be configured as automatic procedure made every time on app startup. Hence in order to get messages, the app is required to have a working session with the present invention server.

In an optional step 6: Configuring Mobile clients, Mobile user can make various settings in their app from display configuration, to alerting configuration to security setup. The most important ones are setting up the app master password to protect app access to unauthorized or unintended users.

In an optional step 7: Defining access privileges, and client settings, the present invention server can be configured to define mobile user permissions and/or app settings at the server side. These permissions and/or settings if defined are enforced on the mobile app. Furthermore, admin can setup general policy for mobile access authorities and app settings for all the mobile users.

Many organizations are undertaking a long-term approach to replacing a portion of their pagers. A lot of hospitals still need to use pagers for certain staff members, but they also need to be able to message to smartphones for physicians and others. This means supporting a variety of communication devices for the foreseeable future. The benefit of this approach is that some staff members can consolidate devices using smartphones while others may continue to use pagers. the present invention Mobile enables users to do what makes sense based on staff and messaging requirements.

In another embodiment, the present invention follows a simple client-server model. In which the server provides the service, and the clients that can be mobile apps on ANDROID, IOS™ OR BB10, or a desktop app on WINS platform consumes the service to receive messages.

The present invention's communication is based on a proprietary protocol called HNP, short for HipLink Notification Protocol. This protocol is being designed to allow interconnection with clients on heterogenic platforms. The protocol design has special considerations for security, scalability, extensibility, and usability.

The HNP protocol uses the TCP/IP as the carrier protocol for its communication. This enables the client apps (including mobile apps) to communicate with the server using any network type whether it is LAN (Ethernet), WLAN (Wi-Fi), carrier data networks (GPRS/Edge, EvDO, HSPA, LTE, etc.). Also the communication is session oriented, and its packets ordering, sequencing, and retransmission is all depends on the TCP layer.

The present invention uses the TLS (Transport Layer Security) protocol to implement CIA in the communication. Hence all the communication is in encrypted form, with proper message checksums to ensure message integrity, along with digital signatures to authenticate the server side.

The present invention also integrates with the platform specific push notification services, to push alerts to the offline user regarding new messages waiting in the queue. This communication follows a different workflow, and it is often goes through the notification service gateways that contacts the mobile device by its own ways, and route the push notifications to the device. Currently the present invention only supports integration with APNS for iOS™ client apps.

The Enterprise Mobile Notification Solution has several design attributes in which the most essential are regarding communication and security aspects.

The present invention is based on a platform neutral communication mechanism, or protocol, that enables communication to all types of mobile and desktop platform clients. There is no functional distinctions at the sever side for the receiver device whether it is BLACKBERRY, ANDROID, IPHONE or a desktop client. Hence this enables solution to support environments with heterogeneous platforms.

The present invention support of Wi-Fi-enabled devices has never been easier than with the smartphone apps. The user can set his smartphone for Wi-Fi communication to the server when he is in the office, and the system server will automatically switch between his carrier's data network and the Wi-Fi network when in range.

The mobile apps are designed to give more preference to Wi-Fi, and automatically switch from carrier data network to Wi-Fi, when the device enters a Wi-Fi domain.

The present invention requires each client maintains a persistent connection with the system server. The persistent connection allows real-time messaging, along with availability and presence information. The mobile app uses the specialized developed mechanism to manage and maintain this persistent connection. The mobile app are designed to reconnect automatically when the existing one breaks, or when network coverage changes from Wi-Fi to carrier data network or vice versa.

The mechanism provides real-time or close to real-time notification with messaging failures identified at the earliest. There is no queuing mechanisms in the communication path once the message is dispatched.

The present invention provides deterministic messaging service, with clear and on time delivery and message read reports. The reliability is further enhanced with the inclusion of support for offline messaging which is configurable. With offline messaging support disabled, users can define backup workflows to continue messaging to offline users using other protocols.

The present invention provides security at the transport layer, making all the communication between system server and mobile clients engulfed (blanket) in a secure transmission channel. This channel acts as a secure tunnel between server and each mobile client, whereby all the communication happens within it. This not only makes messaging secure, but all the other communication regarding signaling, file transfer, etc also becomes secure.

The secure communication layer is TLS based, and it is established after proper authentication procedure. This mechanism provides security against replay and other common attacks.

The mechanism enables complex messaging workflows which are nowadays required in everyday operations in an organization. It allows the system and mobile clients to send canned response choices with the notifications and ability to enable the user to select one or more choices and send them immediately back to the system.

The present invention supports messaging with attachments. The attachments are sent separately from the message, but shown in association with the message on the mobile app. The attachments can be of any format from media, office or other category of files. The file transfer support is provided in two forms; in-band, and out-of-band.

In the former case, the files are transferred using the existing connection between the server and the mobile app. Whereas in the out-of-band, a new connection is established by the mobile app to a separate port at server, and file is transferred independently of the primary connection. The out-of-band transfer is faster than the in-band, but requires a second port to be open at the server side.

The Enterprise Mobile Notification Solution provides full end-to-end security using the Industry accepted cryptographic algorithms, for example AES. The end-to-end security means, All communication between the system server and the HipLink mobile apps is secured, All the messages saved on the devices are secured, and All the messages saved on the devices can be managed with automatic deletion, message expiry, and remote administration.

To ensure message confidentiality, integrity and authenticity, along with security against various attacks the system uses the best possible mechanism, Transport Layer Security (TLS) which is recognized as security standard in the enterprise community. TLS, the successor to SSL, offers a robust security protocol meeting IETF standards for connection security. Using TLS, the system k smartphone apps support a wide variety of bit-rate encryption options that include 128, 196 and 256-bit AES encryption standards configurable by the administrator.

One of the more interesting features the system has developed by using this standard is a "single session" handshake process. By using this method, the TLS encryption key is constantly changing on each communication session between the system server and the mobile device.

This short "time to live" makes cracking the encryption extremely difficult as the key is constantly regenerating with each communication transaction. The security features apply to all phases of message delivery both messages sent to the phone and responses back.

The Enterprise Mobile Notification Solution support real-time messaging, where messages can be received within one second time interval after dispatch. Also all the messaging workflows are designed to be 100% deterministic, letting know the dispatcher immediately regarding the message delivery status whether it is succeeded, failed, or put on hold for later delivery. In the case of later delivery, the messages are sent (as offline messages) when the recipients gets online.

The present invention also support integration with mobile platform specific Push Notification services to dispatch new message alerts to offline users, gaining their attention to come online. Right now as of this writing, the present invention only supports Apple's APNS (Apple Push Notification Service) for the iOS™ devices users.

The mobile apps implement always online methodology for the mobile users. Hence the apps are designed to always keep the user online for easy access to new messages in real-time. The Android app has special capability to start automatically on device reboots. The apps and their processes are design to put least amount of contribution to the device battery drain. The iPhone app is tested to give an average battery drain within 2% per hour, whereas Android app gives within 3% per hour with normal operations.

The APPLE Push Notification Service is a service created by Apple Inc. that was launched together with iOS™ 3.0 on Jun. 17, 2009. It uses push technology through a constantly open IP connection to forward notifications from the servers of third party applications to the Apple devices; such notifications may include badges, sounds or custom text alerts. Due to limitation in message size, reliability, and security, one cannot send actual data to the iOS™ device. Hence APNS is only use to let know iOS™ users regarding new items that need to be processed or fetched by the iOS™ app.

The APNS support integration requires certain artifacts in order to enable server software to send push notifications to the iOS™ devices. These are: Define App ID; A SSL Certificate for the server product, and The private key of the SSL certificate.

Besides that above, a new key pair may be required, with private key saved in a separate file and public key as a certificate request (.CSR) file. The certificate request is then send to the Apple to get it signed and sealed. Then an app ID is required to be registered at the Apple's iOS™ developer portal for the iOS™ app. After that, the SSL certificate will becomes available to download from the provisioning profile panel. This SSL certificate and the private key is then use in the system server to configure integration with APNS gateway.

Now referring to FIG. 1, the iOS™ app is created with a provisioning profile enabled with APNS support. The iOS™ app register for APNS alerts with the APNS gateways, and receives its device-token. The iOS™ app sends its token to system server. The system server must be configured with APNS SSL Certificate and its associated private key. The system server when needs to send a notification, connects to APNS gateway using SSL/TLS sockets, and dispatch the alert. The APNS server sends the alert to the iOS™ device.

The Enterprise Mobile Notification Solution is based on a simple client-server model. The system server opens up the service (HNP) server port, whereas the clients that can be of Android, iOS, BB10, or Win Desktop connects to that server port to establish the communication link. Besides that the system can also be configured for a separate server port for file transfer, which is being used to send message attachments to the target recipient mobile app. If system server is configured for APNS, then it will be making connections to the APNS gateway on a fixed port 2195 to send push notifications. Each iOS™ devices (IPHONE, IPOD and IPAD) will make connections to the APNS gateway on either port 5223 or 443 (if unable to connect on 5223) to register themselves for the APNS service, and to get new notifications.

This is the main primary communication link. This is the basic requirement for the Mobile Notification Solution to work. The system server will open up a HNP service server port. All the client apps (including mobile apps) will connect to this port. This port is completely configurable, and can be set or changed from the HNP configuration panel.

Figure 2:
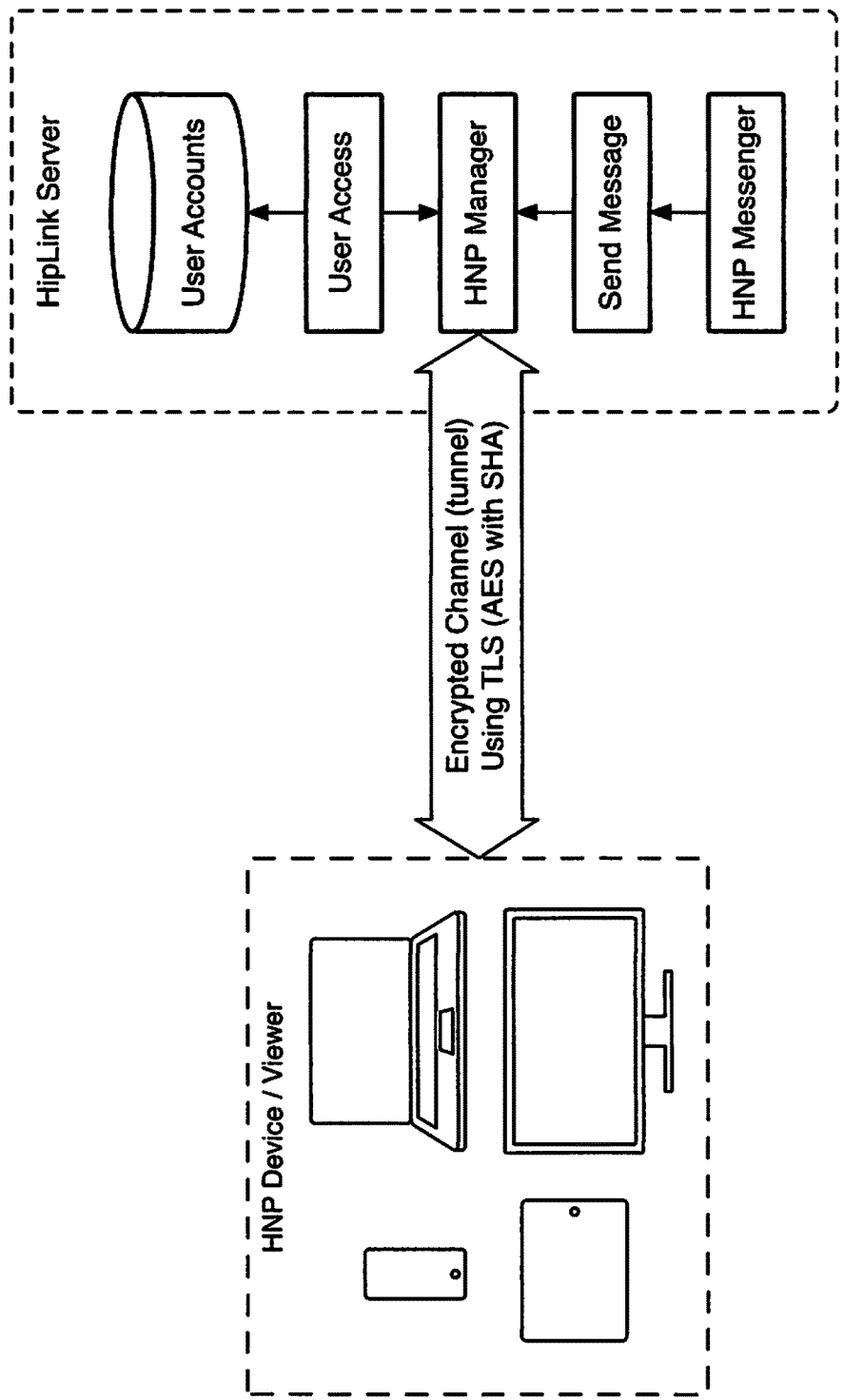
FIG. 2 illustrates how the communication link is protected and secured by TLS protocol.

Now referring to FIG. 2, this communication link is protected and secured by TLS protocol. As per TLS requirement, the server must be configured with a server certificate and its associated private key. The TLS will create a secure tunnel between the server and the client, and all the communication regarding messaging, reporting, and other requests, and their responses are sent through this tunnel.

File transfer communication is a secondary communication link that is required only for transferring files that are attached with the message. However as discussed above, the present invention allows two type of transfer mechanisms, and this separate communication is only required when out-of-band mechanism is selected. The server port is defined in the system's messenger, and can be changed to any value as per requirement.

When any client app receives a message with attachment(s) that requests to pull the files using out-of-band mechanism, then the server port is also provided, and the client app then initiates the connection to that port, and receives the files in encrypted form. The encryption keys are sent separately with message in the main HNP communication.

Sending APNS push notification is only required when server is configured for APNS support. When a message is sent to an offline iOS™ device user, the server dispatches a notification through APNS to the iOS™ device to let know about the new message waiting in server. This is done by connecting to either: gateway.sandbox.push.apple.com, or gateway.push.apple.com on port 2195. If the certificate type is development, then #1 is used, otherwise (in case of production) #2 address is used. The connection is secured using SSLv3, in which server uses the configured APNS SSL certificate and private key to also authenticate itself as client to the APNS gateway. After establishing the secure connection, the push notification is sent to the APNS gateway in a binary format, along with the device token already communicated to the server by the device at login.

Each iOS™ device running the HipLink mobile app will be communicating with the APNS gateway server on port 5223 (or 443 if 5223 is blocked). Each client will maintain a single persistent connection with the APNS gateway. After establishing the connection, first the app registers itself for the APNS notifications, and gets its device token. Secondly on the same connection, it waits for the push notifications. On push notification from system server, APNS gateway forwards the notification object to the device over this connection.

The table of FIG. 3 provides a list of all the network communications that occurs in the HipLink Mobile Notification Solution. This information can be used to define network firewall rules.

Figure 4:
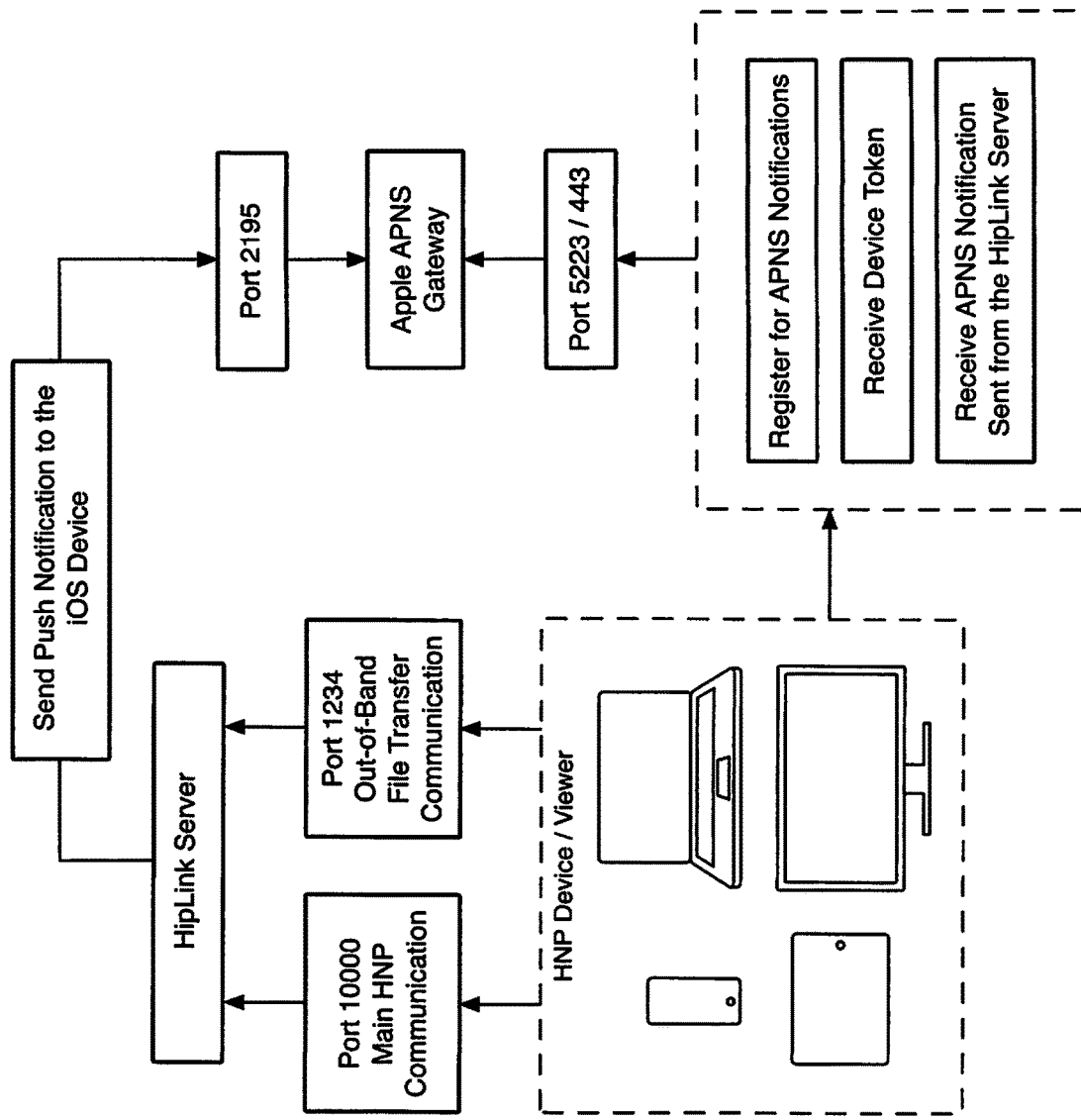
FIG. 4 illustrates the overall communication and data flow in the present invention.

Now referring to FIG. 4, the overall communication and data flow in the present invention. The arrow shows the connection initiation direction, whereas data flow will be bi-direction in each of the communication flow. The communication flow engaging APNS gateway is only applicable for iOS™ HNP clients.

HNP communication is the primary link between the system server and the HipLink client apps. The client app makes a permanent connection to the server, and tries to keep it alive for the life of the app's process.

The TLS (Transport Layer Security) connection is made over TCP, and after successful connection, TLS is started immediately. First the server sends its public key (in its server certificate) and client uses it to establish the initial secure connection. The TLS protocol then does the handshake procedure in which cipher capabilities are negotiated, and a shared secret key is established. After that the newly created key is used to secure the following session.

The shared key has an expiration time, and when it expires, it enforces both sides to go through the key creation procedure again. This is done so as to ensure the session stays protected, and if a key is compromised, then it gets changed with a new one soon. Also it helps to protect against replay attacks, and man-in-the-middle attacks.

Figure 5:
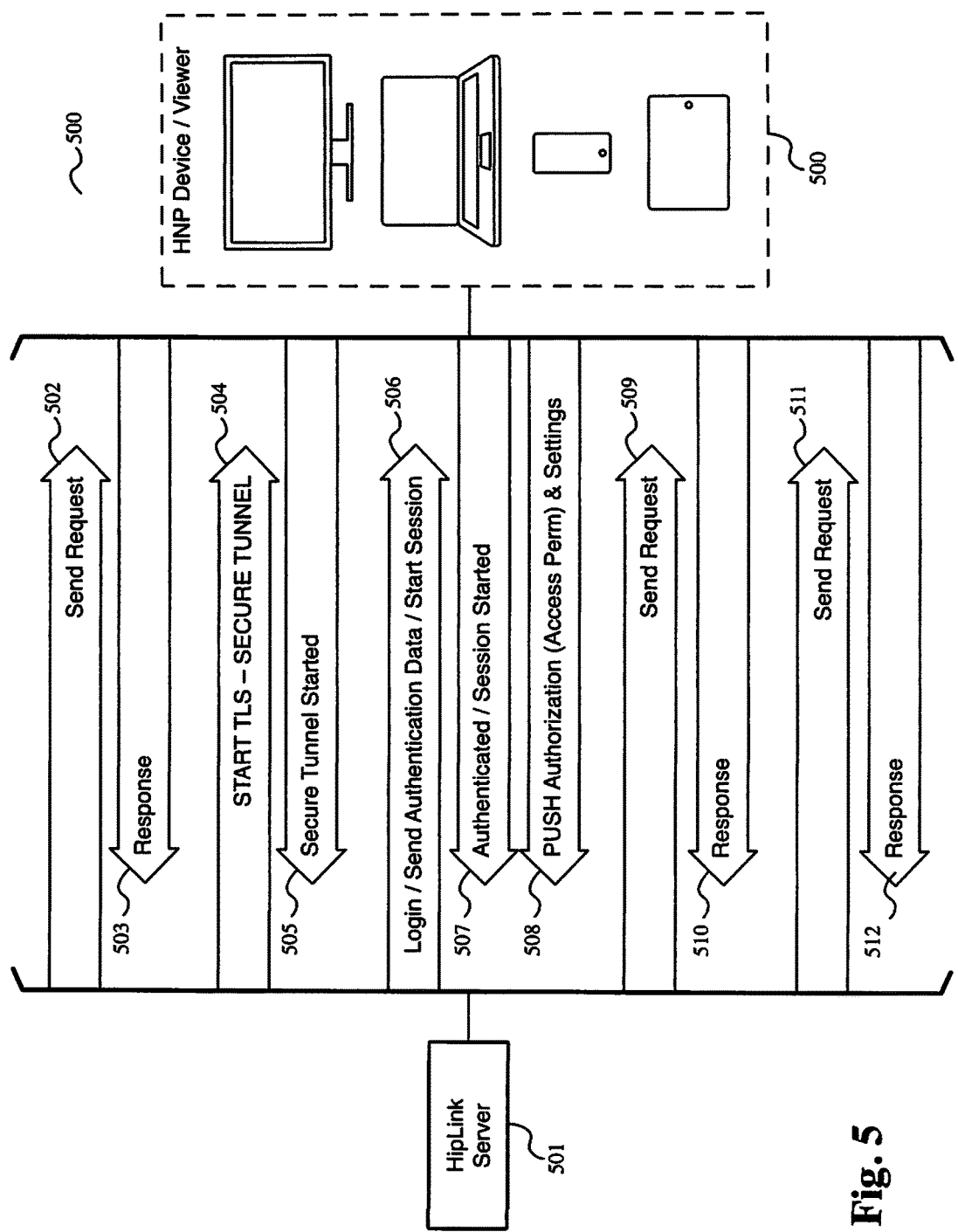
FIG. 5 illustrates the HNP Authentication & session communication starts after TLS successfully initiated.

Now referring to FIG. 5, the HNP Authentication & session communication starts after TLS successfully initiated. The first process is the user authentication. In this process, the user ID, password, and activation key is sent to the server (in secure tunnel). The server authenticates the user, checks its activation, and then responds with user permissions (access privileges) and settings (optional). The permissions further disables app functions (leaving others as enabled), whereas settings changes the usage behavior. After that HNP session gets started.

Once the HNP operations session gets started, then client app can send any request to execute operation at server. Also if the server has a message for the device, then the same HNP connection is used, and server pushed the message to the device.

Besides receiving messages in this session, client can send requests to: query for contacts, send a message to other contacts, query a sent message status, confirm/reject a message, log out of the session, etc.

The HNP Session Lifecycle will remain active until the device has some form of data network to stay connected, user does not logoff explicitly, and the client app kept running (either in background or foreground).

Figure 6:
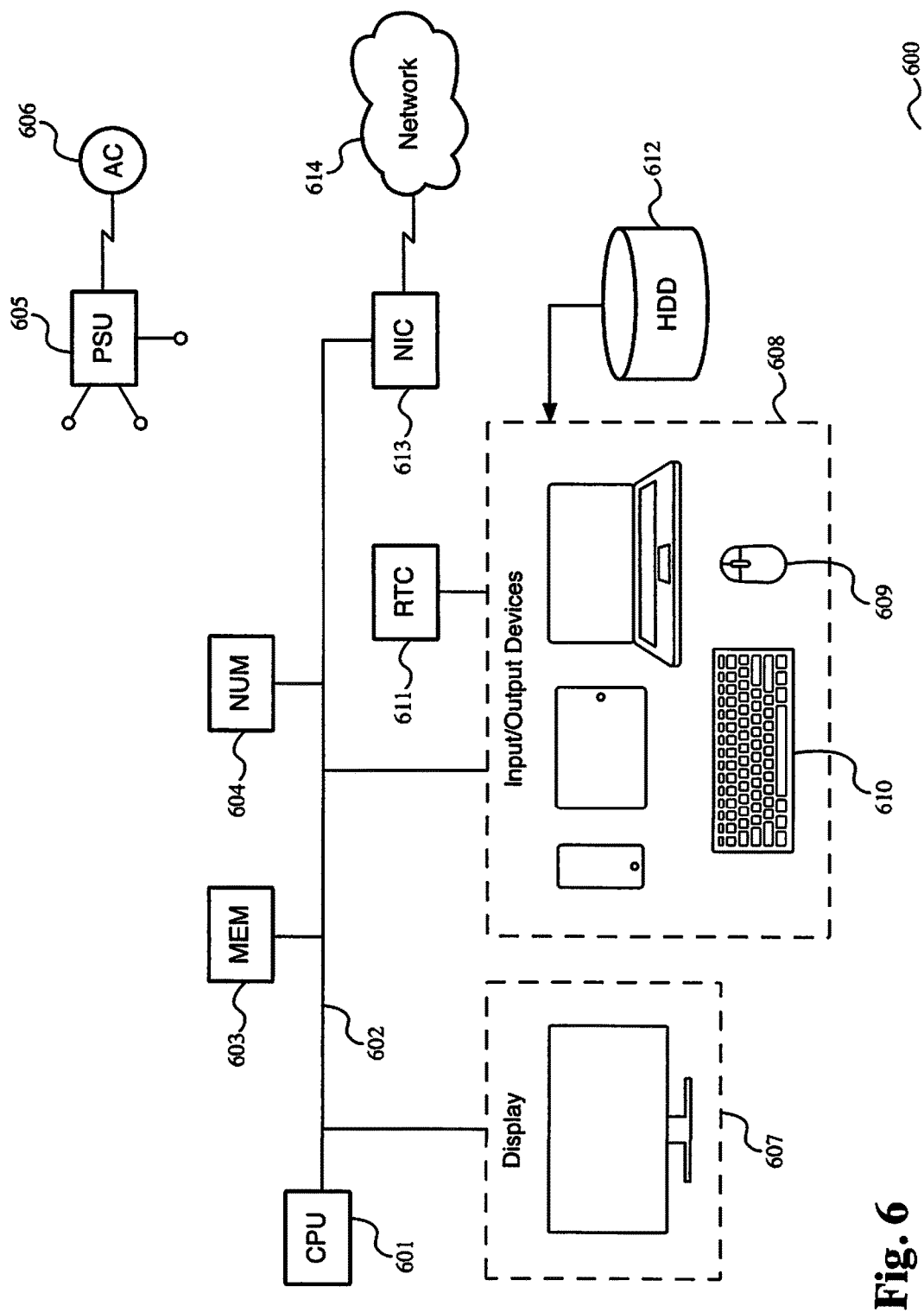
FIG. 6 illustrates the hardware overall design; showing all the required components in a server, and how they are being connected for data exchange.

FIG. 6 shows an exemplary overview of a computer system 600 as may be used in any of the various locations throughout system 700, as described below and throughout. It is exemplary of any computer that may execute code to process data. Various modifications and changes may be made to computer system 600 without departing from the broader spirit and scope of the system and method disclosed herein. CPU 601 is connected to bus 602, to which bus is also connected memory 603, nonvolatile memory 604, display 607, I/O unit 608, and network interface card (NIC) 613. I/O unit 608 may, typically, be connected to keyboard 609, pointing device 610, hard disk 612, and real-time clock 611. NIC 613 connects to network 614, which may be the Internet or a local network, which local network may or may not have connections to the Internet. Also shown as part of system 600 is power supply unit 605 connected, in this example, to ac supply 606. Not shown are batteries that could be present, and many other devices and modifications that are well known but are not applicable to the specific novel functions of the current system and method disclosed herein. A non-exhaustive listing of such additional and/or alternative devices and modifications could include, for example, wireless interfaces, such as Wi-Fi, BLUETOOTH™, and various types of cellular radios, as well as custom radio/wireless interfaces, screens, and various types of touch panels as well as other input devices, speakers, buzzers, vibratory and tactile feedback devices, etc.

Optimizing Message Delivery

Systems for message dispatching and communication must create database transactions to deliver messages and interact with carrier-specific protocols through gateways.

Figure 7:
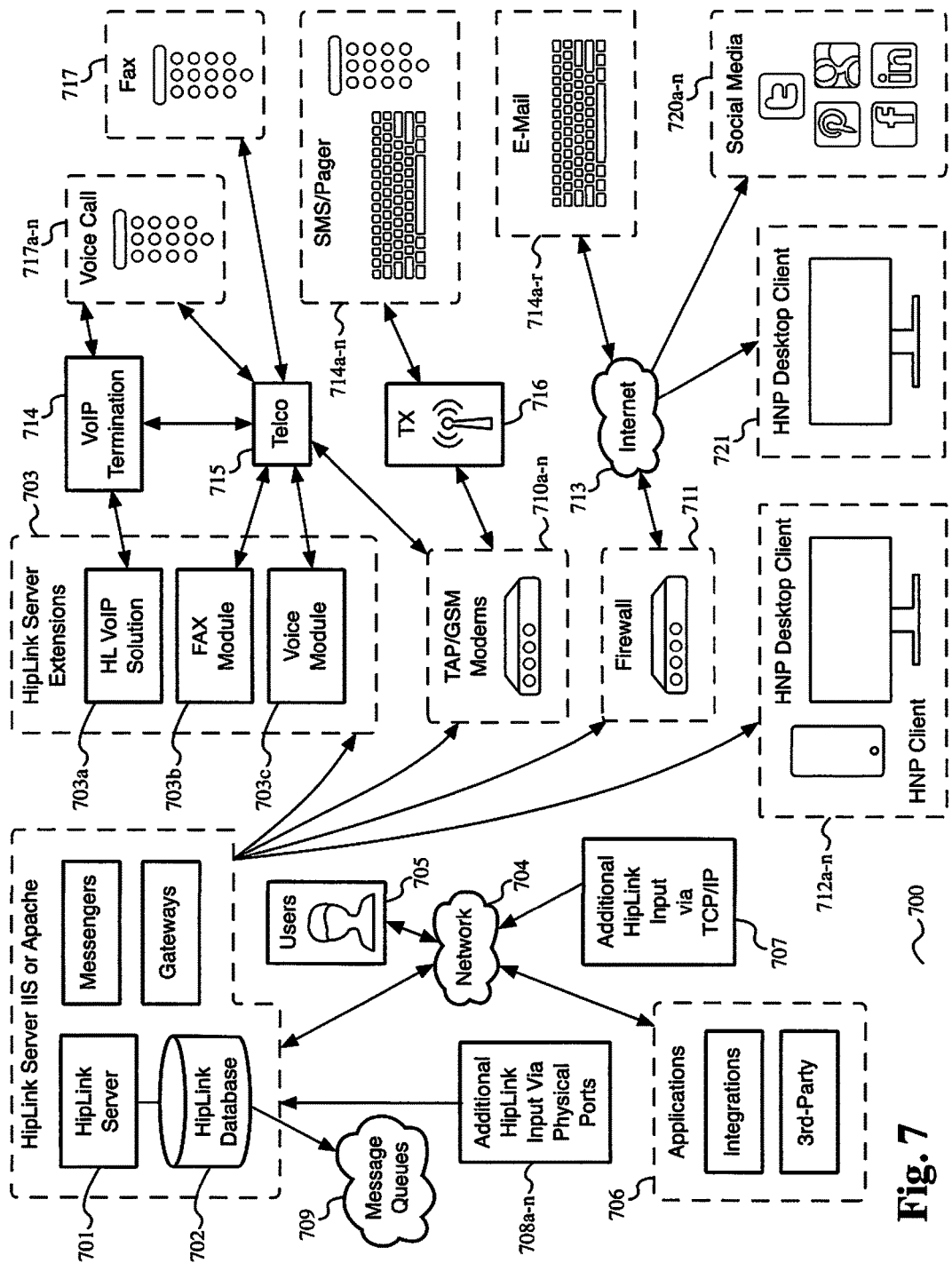
FIG. 7 illustrates the overall HipLink functional, and data flow design; showing all the functional modules, their interaction with the each other. Moreover, it also shows all the types of communications HipLink does, and how it is being made. Besides that it also shows the information flow, their sources, and destinations.

FIG. 7 shows a high-level overview of system 700, according to one aspect of the system and method disclosed herein. System 700 has an extensive framework to take advantage of protocol specific abilities. To speed up the dispatch of the alerts, system 700 uses custom-developed sockets and intelligent grouping of messages to make the message workflow more efficient, thus enabling higher message dispatch per unit of time. Developing a unique, innovative code implementation for the protocol stacks endows system 700 with the ability to modify protocol execution workflows and deploy efficient tactics to improve overall dispatch rate for each carrier. Today's systems use standard protocol stack packages that do not provide the same advantage. In system 700, user 705 can send commands over network 704 to server 701 via application 706, which may reside on one or more of the user's machines. Commands from additional sources such as pager, email, etc. all go through gateway 707 to server 701. Server 701 has access to database 702, as well as additional external sources 708*a-n*, such as ASCII serial devices, TAP modems, GSM modems, etc. Database 702 also connects to message output system 709. Server 701 also has connections to server extensions such as VoIP solution 703*a*, fax module 703*b*, and voice module 703*c*. There can be also additional external modules such as, for example, modems 710*a-n*, which may include, for example, TAP and GSM modems, to connect via cellular network symbolized by tower 716 to pagers and cell phones, such as, for example, devices 718*a-n*. All those call sources may go through either a classic telco 715 or VoIP telco 714. Voice calls may be delivered via either telco type to voice call devices 707*a-n*. Also the fax server 703*b* can deliver messages to exemplary fax machine 717. The TAP and GSM modems or VoIP modems can call into cellular network 716, which can deliver messages to pagers and SMS devices 718*a-n*. Through a firewall 711 the server 701 can also connect to a public Internet 713 where, for example, additional clients can be set on computing devices such as device 721 and connect to social networks and messaging units 720*a-n* and to additional devices 719*a-n* through email. It is clear that the elements shown here are only exemplary and can be replaced or augmented with, for example, cloud-based or virtualized elements of the same nature and function, or any combination thereof. Also, each and every one of the components may be a physical component, a virtual component, in a cloud, on the Internet, etc. Additionally, the section of the network that is shown as a private network may be an actual private network, or it may be a virtual private network running on top of some other public or semipublic network. Just to be clear, even though a message may be sent via IP network 714 to one of smart phones 707*a-n* or via wireless network 716 to devices 718*a-n*, or in yet other cases via public Internet 713 to devices 719*a-n*, with each message transmission means using different protocols and to some degree different networks, the user experience remains essentially the same. Also, one and the same device can belong to more than one of the recipient groups 707*a-n*, 718*a-n*, and or 719*a-n*, since these are distinguished by protocol primarily, and today many devices can support more than one protocol concurrently.

Figure 8:
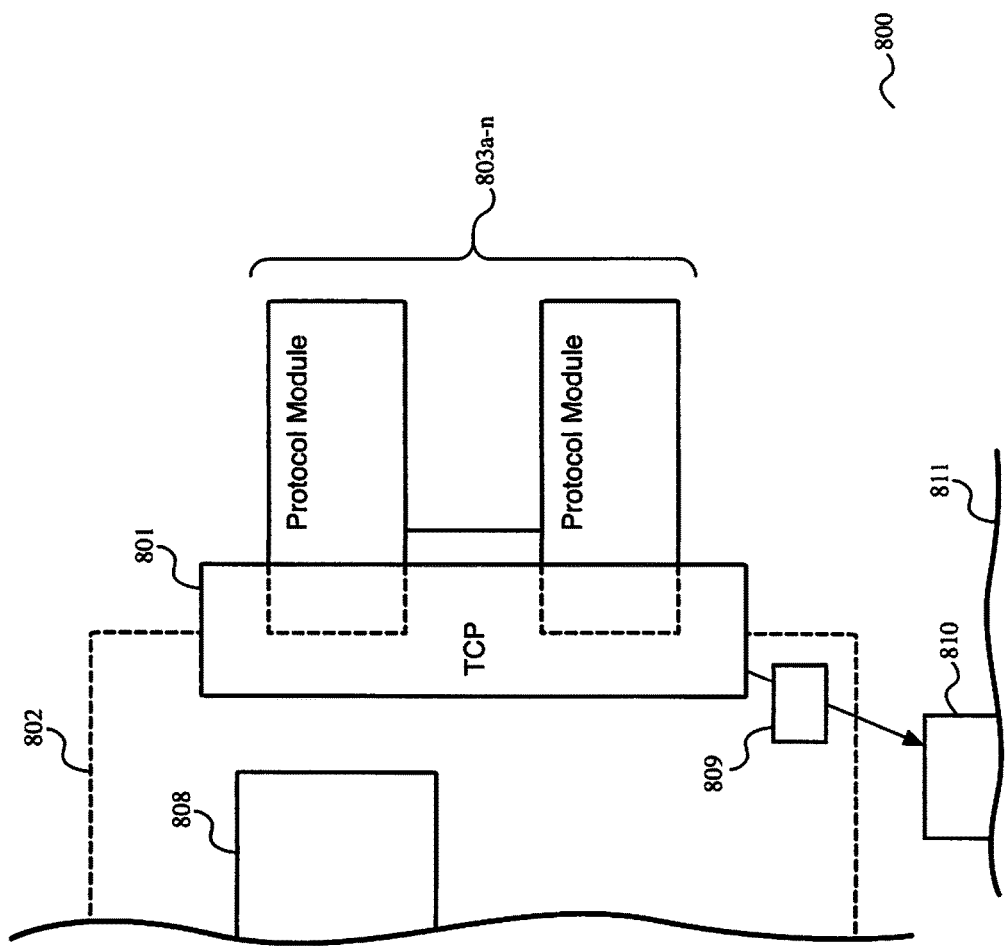
FIG. 8 illustrates architectural overview of a the framework of a special TCP socket that offers TCP socket persistence ability in the present invention.

FIG. 8 show an exemplary architectural overview of a the framework 800 of a special TCP socket 801 that offers TCP socket persistence ability along with the ability to group a single campaign as a single unit. The system attempts to dispatch each unit in a single transaction using the protocol-specific support available in, for example, carrier types such as SNPP, WCTP, SMTP, CAP, and OAI. In socket persistence, the system and method disclosed herein does not tear down a socket and the protocol session over it, but rather caches it in memory. When a dispatch is made to the same gateway, then its previously connected socket is retrieved, checked for connectivity, and re-used in the later dispatch. This approach saves a lot of time by avoiding setting up the socket, protocol session, and SSL/TLS handshake if it is part of the connection configuration. Hence subsequent dispatches speed up as less time is wasted on creating their connections. In message grouping, framework 800 groups all the identical messages that a single campaign plan to send, using the same carrier in a single bucket. The system then uses protocol-specific support, such as, for example, the CC in SMTP (email) protocol, to make a single dispatch of messages to multiple recipients. This approach offers great efficiency in the dispatch workflow. Framework 800 is designed to help our messengers (message dispatchers) to maximize the number of message dispatches in the least number of transactions and connectivity attempts. In framework 800, TCP socket 801 lies at the boundary of internal system 802, with the main process 808 running. Several protocol modules 803*a-n* can be bound permanently or loaded as needed into TCP socket 801. In turn, TCP socket 801 can connect to communication module 809 to control hardware 810 that sends the signal over the network 811 to the various channels for sending notifications, as discussed throughout. Even though a single protocol may be used some cases, there may be more than one communication unit 810 to enable parallel message transmissions. For example, there may be specialized modems (examples shown in FIG. 7 as modems 710*a-n*), for GSM or other networks, cellular networks, or other special radio networks in lieu of regular wired or wireless networks.

Faster Queue Access for Messages

Notification systems use queues to process messages as they are generated. These queues can experience long access times in queuing operations when either the load on the queues increases or the number of accessing clients is increased. The degradation in access time is usually directly proportional to the number of users and can result in significant delay message delivery.

Figure 9:
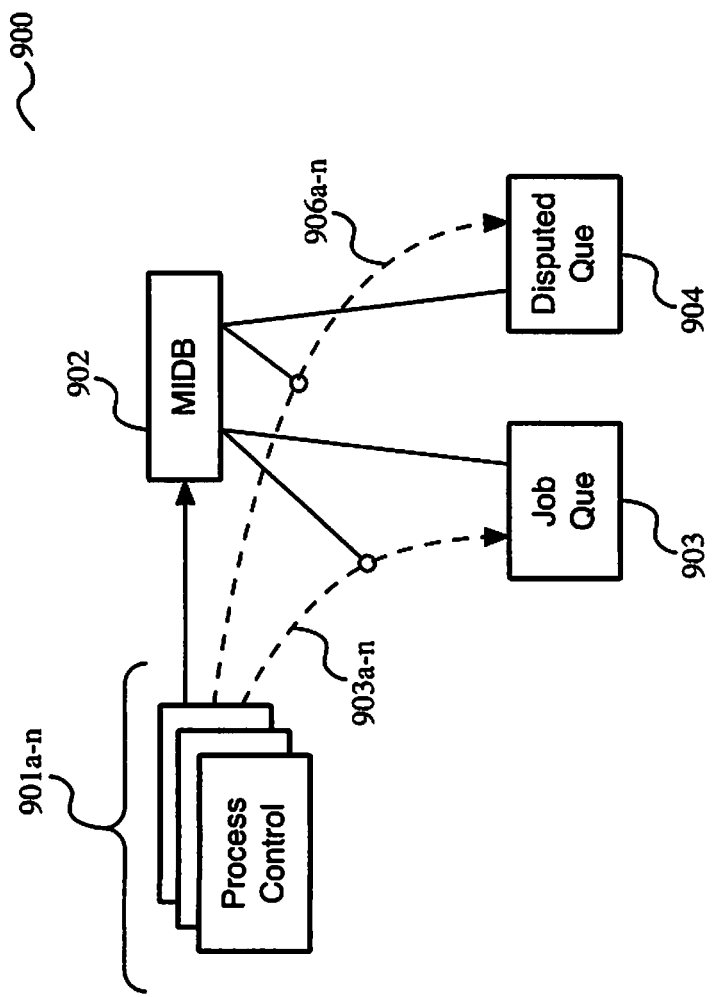
FIG. 9 illustrates the message queue design in the present invention.

FIG. 9 shows an exemplary queuing system 900, according to one aspect of the system and method disclosed herein. Queuing system 900 is impervious to the issues cited above because each queue is maintained directly in the file system, using an embedded database system to maintain the queue contents. Thus the processes that query the messaging queues may be used in any order, pulling and pushing data (messages) in any way. This approach is unlike other messaging solutions that use standard and third-party queuing systems. A weak queuing system can choke a whole system. In queuing system 900, fast access databases hold meta information for each queue, and each queue has its own database. The database is accessed and managed through an SQLite3 embedded engine that gives very fast and efficient access to the database. This choice in technology and design enables the system to query message properties and characteristics without accessing the messages themselves. Hence it enables efficient operation on queues to gather like protocol type files, purge queues or certain messages, access old messages, etc. In queuing system 900, multiple process controls 901*a-n* create jobs. The jobs are then sent via messaging interface database (MIDB) 902 into job queue 903 and dispatch queue 904. Multiple processes may be sent at the same time, as indicated by process movement lines 905*a-n* and 906*a-n*. Rather than locking the whole table(s) of the MIDB, a semaphore flag is set for each of the entries being used by one of the processes, allowing the tables to be shared continually by all the processes, putting in and taking out things from those queues. This approach results in much higher throughput of jobs.

Support for Custom Dispatch Workflows and Protocol Customization

The ability to customize the dispatch workflow is one of the essential capabilities for any messaging system. Any lack in this regard makes the system incompatible with public carrier online services due to skewed/non-standard protocol implementations. It is a challenge to support customizations required by customers and allow multiple implementations of a protocol to co-exist in a system to support various public carrier online services.

Figure 10:
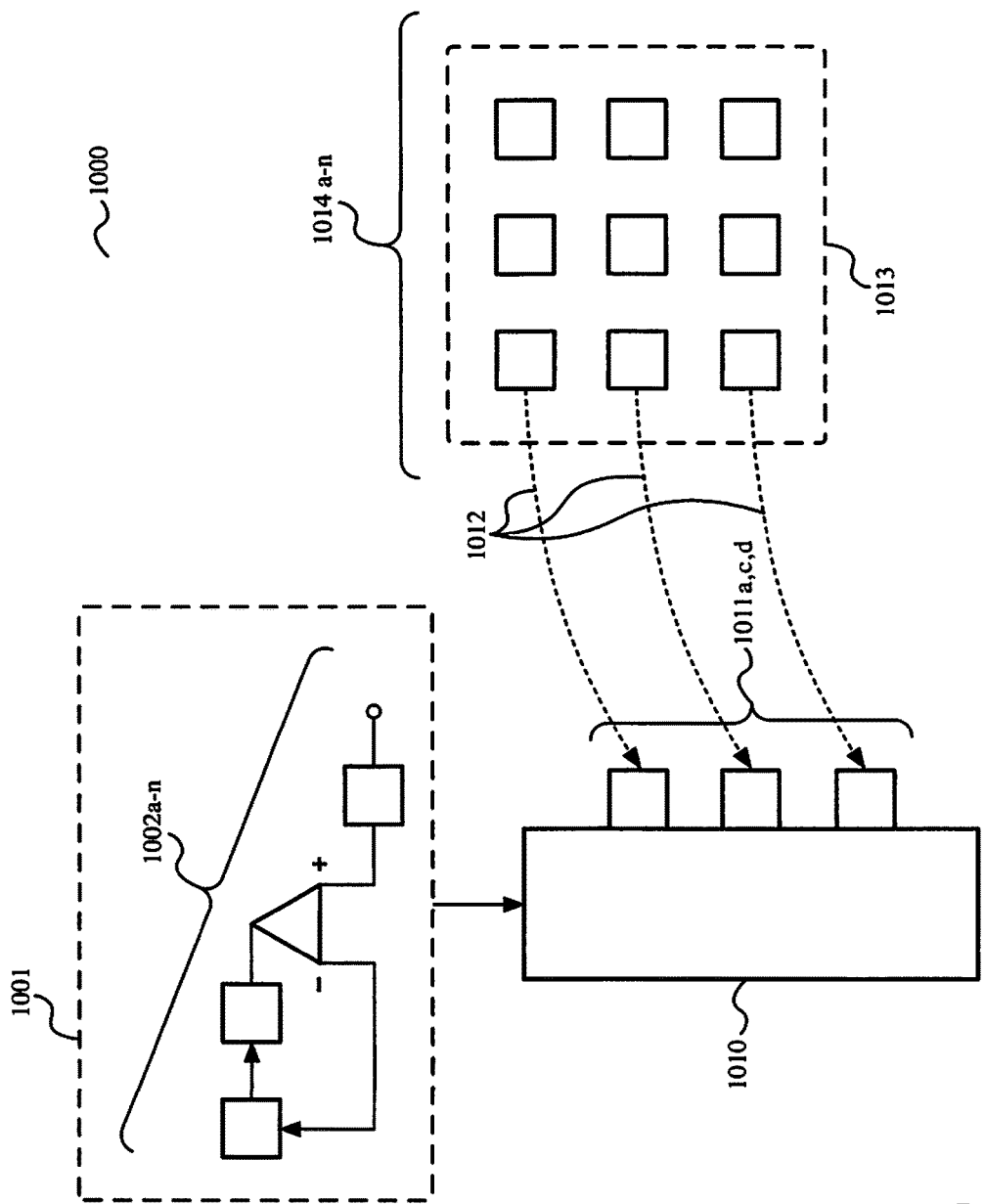
FIG. 10 illustrates the HipLink design for the dispatch services where the communication mechanisms are isolated as separate protocol stacks in separate loadable modules. The dispatcher service loads one of these protocol stacks depending on the dispatcher type, and its special association with a carrier.

FIG. 10 shows the implementation 1000 of protocol stacks and a queuing system, according to the system and method disclosed herein. The implementation approach shown here enables the design of a mechanism on top of the protocol stacks and queuing system that separates each protocol implementation and enables the system to either make it a generic stack, or bind protocol stacks with specific online service(s). Hence this approach enables clean customization of a protocol processor by isolating it as a custom driver for the specific carrier, separate from the generic protocol code. Unlike systems currently available, the unique design and architecture of the system and method disclosed herein permits support for than 20 communication protocols along with the ability to permit co-existence of custom versions of a protocol implementation for specific online services (carriers). The system message dispatch service (messenger) is designed to separate the messaging workflow from the messaging protocol implementation (stack). All the messaging protocol stacks are implemented as plug-and-play drivers, whereas the messaging workflow, which dictates how a messaging process may execute, is implemented insides the messenger service as the messaging core. The core depending upon the messenger type enables the system to dynamically load and link one or more protocol drivers. These drivers implementing the protocol stack do all the protocol-specific communication and processing. The framework supports two or more drivers implementing same protocol, but with one of them developed with customization for a certain carrier. The system is configurable so it knows when to use which driver for message dispatch. Section 1001 in FIG. 10 contains exemplary modules 1002*a-n*, as an example of graphical workflow management. In other cases, workflow management may be done with simple scripts. In many cases, a graphical interface is used only as an entry point, and then the interface is converted into some scripting language. In section 1012 the output of the workflow management is then converted into a set of drivers 1011*a*, *c*, or d, which are needed to perform that workflow. These drivers are plugged into system 1010 (a simplified view of the main modules of the system shown in FIG. 7), where these drivers produce objects 1014*a-n* as part of output 1013, which are sent via the output queue into the various networks and communication systems.

Detection of Machine from Human in Voice Delivery

In all voice call delivery systems, it is a challenge to determine the target type; that is, whether said target is human or a machine, such as, for example, an answering machine, voicemail, or telephone company auto voice responder). This detection is essential for the system to know how and when to play the message. Current systems rely on the standard detection algorithms whose accuracy is between 70 and 75 percent. If a system can't detect the true status then it may play back the message either before the target (machine) is ready to record, resulting in a partial message recording, or the system may think the caller has hung up and disconnect.

Figure 11:
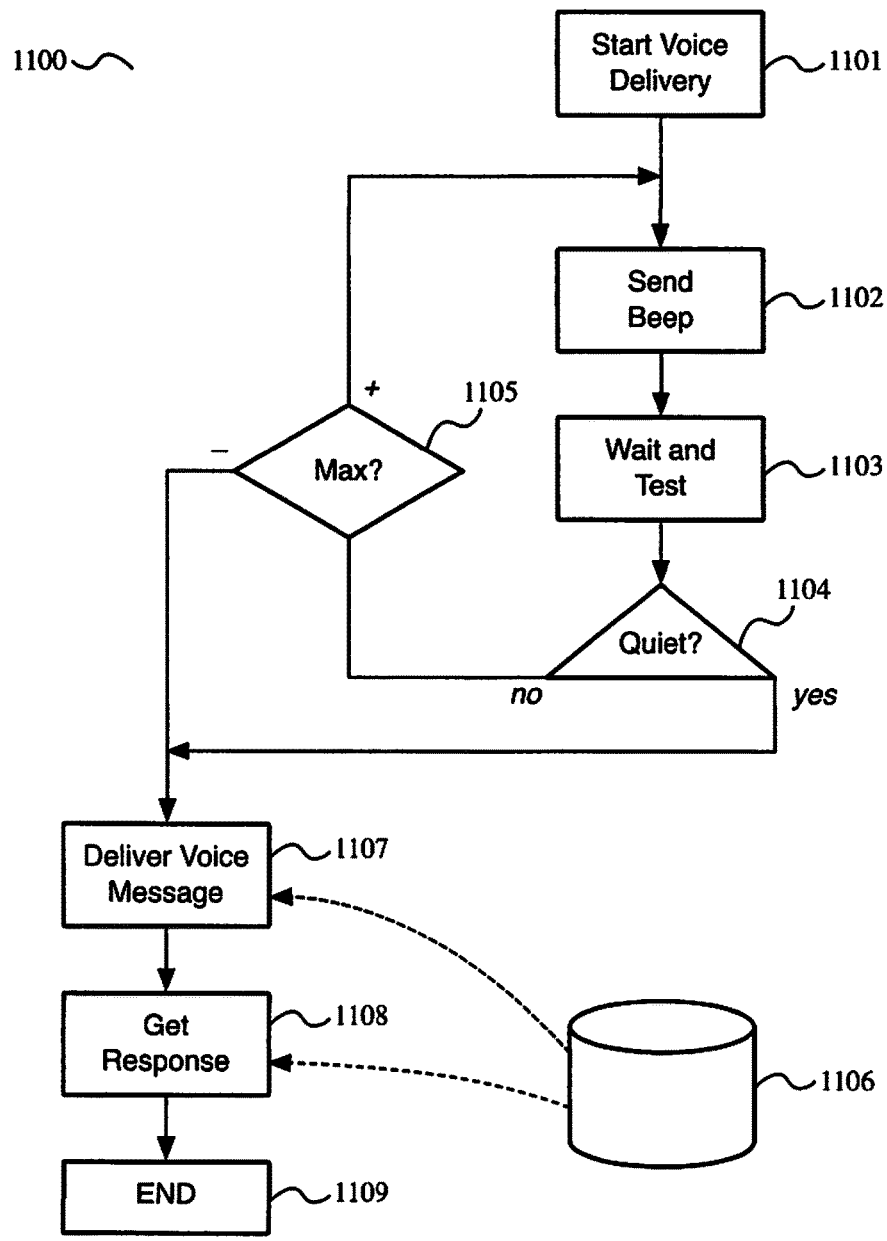
FIG. 11 illustrates the HipLink Voice Modules, and HipLink VoIP Solution 3beep mechanism to determine the call recipient type; whether a human, or an automated machine (answering machine or voicemail).

FIG. 11 shows a unique process 1100 to determine whether the target is a human or a machine, according to one aspect of the system and method disclosed herein. Process 1100 plays a beep (a beacon), and then waits to test for silence for a pre-defined amount of time, a timeout, typically in milliseconds, thus letting the other party and the exchange in between know that the system is still alive and on the line. The timeout typically is greater than the silence duration. Either the timeout occurs or the silence happens as a result of the person called or voice message ending their greeting. This process repeats up to maximum of three times. When silence is achieved (i.e., message playback has ended or person is listening) in the case of a human on the line, the system just sounds three consecutive beeps to the target human, letting him know that the system is alive and about to play an automated message. In step 1101 in FIG. 11, the system starts the voice delivery process. In step 1102, the system sends a beep, and in step 1103, the system waits for a predetermined period and then tests. If, in step 1104 at the end of the predetermined period, the line is quiet, then the system proceeds to step 1107. If there is no silence, in step 1105 the system determines if steps 1102 and 1103 have been executed for the maximum number of retries. If the maximum number of retries has not been achieved, the system cycles back to step 1102. If the maximum number of retries has been achieved, the system proceeds to step 1107. In step 1107, the system retrieves the voice message from data repository 1106 and delivers it. Then in step 1108, the system checks for any response and stores any response in data repository 1106, and in step 1109, the process ends.

Efficient Use of Text-to-Speech Engine

In most current systems the text-to-speech (TTS) engine is used inefficiently and ineffectively. Each line or port uses a dedicated TTS engine instance. If a message is sent to more than one recipient, resulting in n distinct calls, then the same message has to go through the TTS n times on all the lines. If the call workflow has static voice responses, then these responses are converted using TTS every time on the call. Each TTS engine instance requires a separate license, and thus a multi-line system becomes costly due to the need to acquire multiple TTS licenses. Further, a large number of TTS copies is also computationally intense, and hence drives up operations costs further.

Figure 12:
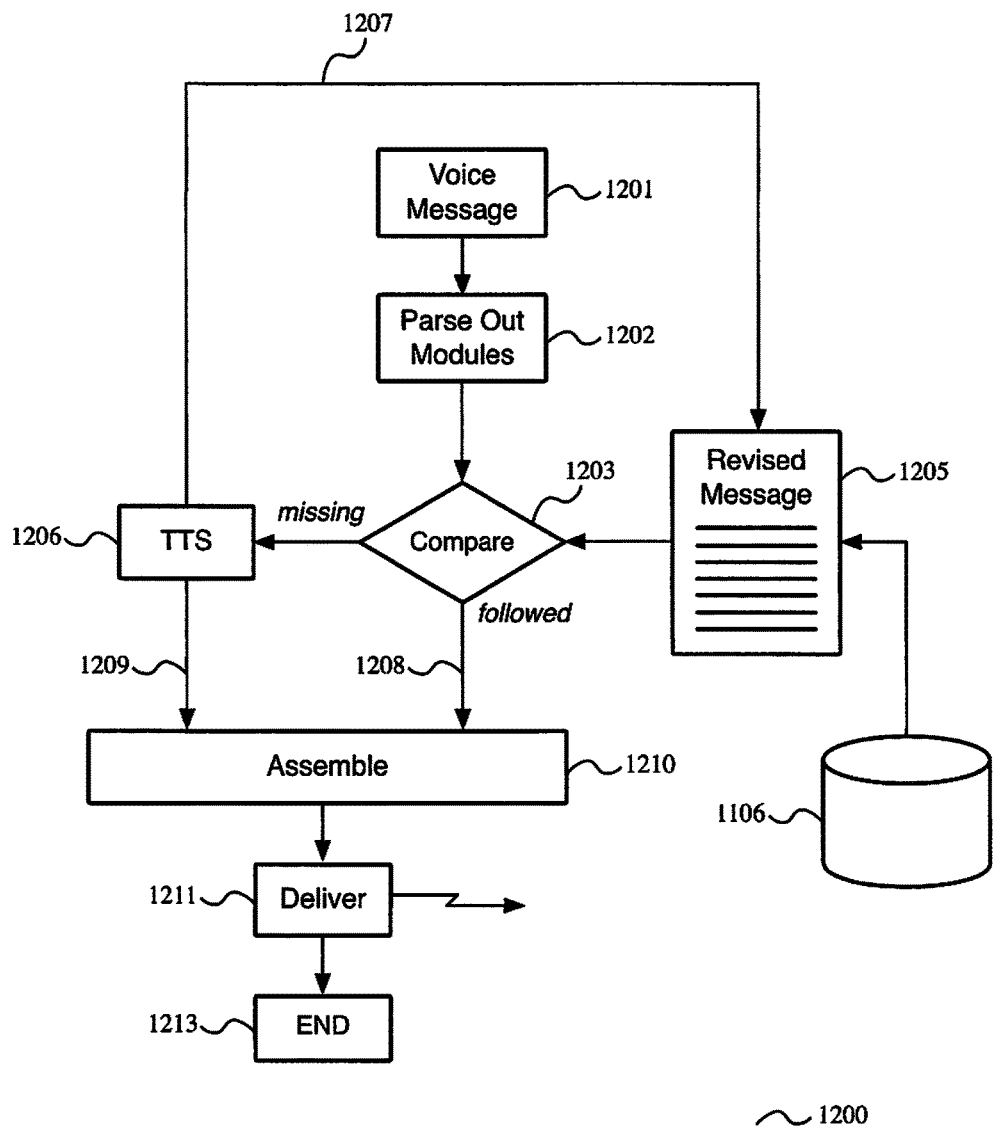
FIG. 12 illustrates the HipLink VoIP Solution's call preparation and dispatch workflow; showing how TTS is being used efficiently with an audio cache.

FIG. 12 shows an exemplary text-to-speech process, according to one aspect of the system and method disclosed herein. This process caches all the TTS outputs, in some cases up to a predetermined maximum (not shown), in a fast database and on subsequent calls uses the pre-generated TTS audios. Hence on every miss, when a message TTS output is not cached, the TTS engine is run, and before starting the call, the output is saved in the database. In the case of hit, the saved output is used, and thus using the TTS is avoided completely in these calls. The cached calls are managed by the system, and outputs that are no longer in use are deleted to make room for others. In step 1201 of FIG. 12, a message is prepared for transmission as a voice message. In step 1202, the system parses the message modules. In step 1203, the system compares the message to existing modules in library 1205 of converted messages, which is held in a local cache. If the message is missing from the library, the process moves to step 1206 to create the message and, in most cases, to add the message to cache 1205 via caching process 1207. After creation of the message, the system moves via 1209 to assemble the message from the modules in step 1210. If, in step 1203, the message modules are found in cache 1205, the modules are retrieved from cache 1204 and sent via 1208 to assembly step 1210. Once the message is assembled, it is delivered via voice, VoIP, or any other suitable network method in step 1211, and then the process ends in step 1213. The design and architecture of text-to-speech system 1200 enables the system to make thousands of calls over 500-plus lines, using only one TTS engine. This approach not only increases voice callouts per unit time, but also helps to lower TTS engine costs considerably.

Development of Fully Background Responsive iOS™ App

The iOS™ mobile platform presents a number of challenges for developers. A primary one is restricting the ability for apps to run actively in the background. The system and method disclosed herein needs to run in the background actively to keep communication with the server, and, in the event of an alert, process the notification in real time. To get around the iOS™ restriction, a background processing facility provides passive, event-based processing. There are also limitations to complete computation on events within a 10-second time frame, so that the iOS™ does not terminate the application and the number of invocations in a unit time in the background. The system thus does background processing in a passive, event-based framework to bring improvements in and make it closer to real-time processing. The iOS™ VoIP facility is used to implement the system communication module. The VoIP facility in iOS™ enables an app to function passively in the background on VoIP signals/messages, and to process and generate control messages in the session. The whole passive processing is event-driven and based on the VoIP socket's activity. On each incoming message, the system event handler is executed that does the processing. Thus this implementation utilizes this approach to implement the system protocol management module to manage (non-VoIP) communication, and with this, the system is able to process incoming messages when the app is in the background. While this approach makes the app in violation of Apple's App Store submission standard, users need not be concerned, because the system is distributed using an Enterprise license. Thus the system has a most essential capability of receiving and processing messages in the background in almost real time, without relying on the push notification service. In most of our customer deployments, they use MDM/EMM solutions (such as MOBILE-IRON™, OPENPEAK™, BB BES™, Samsung KNOX™) to manage their mobile devices running our system. Through this, they can push system updates, and help re-install our system on devices that gets OS updates.

VoIP Queue Design with No Database/Table Locking

The VoIP software, consists of two modules the HLDIS and HL Dialer. The HL DIS is the HipLink Dialer Integration Service. The DIS and dialer share a database between the job queues. The sharing of this database requires locking of tables in the database to make sure data can be inserted or accessed without corruption. However, like critical sections, this table locking also slows down the overall across service workflows. Hence, to save workflow efficiency across the DIS and dialer, this software is designed to access the database in a certain way to minimize the need for table locking. Hence this innovative data access strategy enables both the DIS and dialer software to access data without corrupting it due to concurrent access.

Figure 13:
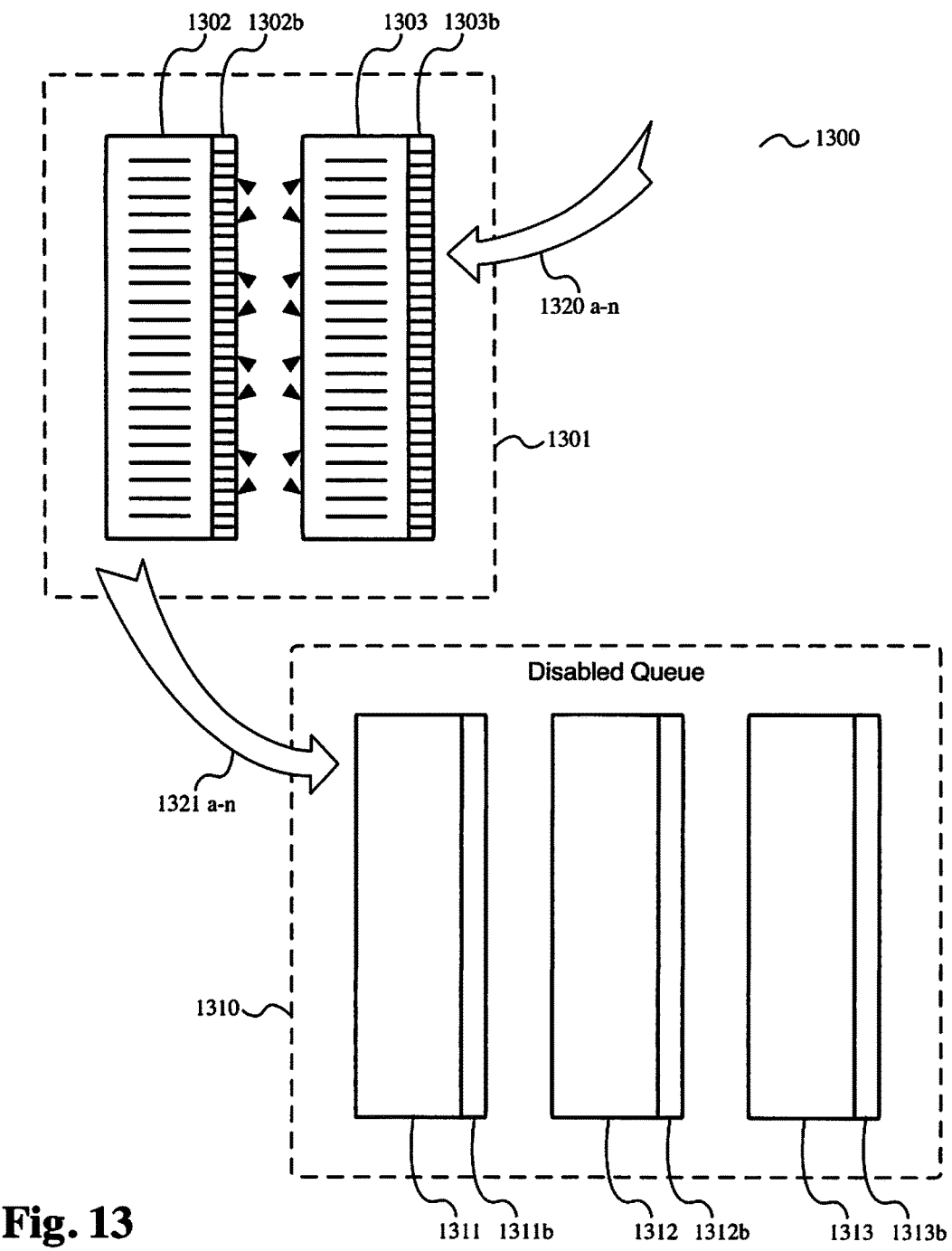
FIG. 13 illustrates the queuing structure in HipLink VoIP Solution, showing the job and dispatch queues, each one storing the complete campaigns along with their calling lists.

FIG. 13 shows an exemplary processing of jobs 1300 through the VoIP database, according to one aspect of the system and method disclosed herein. In the two sets of tables 1301 and 1310, table 1301 serves as a job queue, whereas table 1310 serves as a dispatch queue. Whenever a job is sent to the system, it is first queued in the job queue. Jobs 1320a-n posted from other processes move into job queue 1301, which has two tables, 1302 and 1303, which are used to manage the jobs. Tables 1302b and 1303b are the semaphore columns for table 1302 and 1303, used to lock records for a process while the process is adding or removing items in those tables. This approach eliminates the need to lock the whole table during each process, making the process much more efficient.

The job tables 1301 contains all the jobs (campaigns) including their details, IVR menu structure, and the callout list. The dispatch table 1310 contains jobs that are in progress (in dispatch), along with processed IVR menu, and callout numbers that are cleared for dispatch. The HL DIS system gets all the jobs and their details, and insert them properly in the job tables 1301. Furthermore it then dispatch these jobs as per registered SLA to the dispatch queue for HL Dialer. An SLA define how many concurrent calls the system can make for a customer. Thus if a customer is near its threshold value, then its further dispatches are put on hold till some voice lines get free. The HL Dialer system gets is calling list along with processed IVR and job details from the dispatch tables 1310, and thus prepare, and setup the calls accordingly The problem is moving the data in the two tables of job queue 1301 to the three tables of dispatch queue 1310 in such a way that the job dispatcher module does not process the job whose copy is in-progress. In normal circumstances, this process calls for table locks to lock down read access until the write on the tables finishes. But the system and method disclosed herein implements the data access mechanism in such a way that it does the data movement without locking in tables. This approach makes the table accessible for read purposes even during data writing, thus making possible faster data accesses. Once the jobs have been managed in 1301, a filing process takes the finished jobs 1321a-n (transfer process or daemon not shown). The jobs are put into dispatch queue 1310, which contain three tables 1311, 1312, and 1313. Each table has an additional column, respectively 1311b, 1312b, and 1313b, which again, are used as semaphores. From table 1310, additional communication daemons dispatch the processes, multiple at the time, as indicated by 1322a-n.

Message Dispatcher for High Modularity, and Protocol Customization

The current (legacy) dispatcher module (messenger) has a monolithic design. Due to its design and structure, it is not modular, and hence maintenance is difficult. Whenever a new protocol driver needed to be implemented, it required significant developer time to change the various source files in the core of the dispatcher module.

This problem was resolved by an innovative design in a new dispatcher module, in which the system separates the core from services, puts utilities in separate modules, and structures all the protocol drivers as dynamic link libraries. Only one protocol driver is loaded as per dispatcher type. The dispatcher core owns the overall dispatch workflow, and its events are implemented in each protocol driver. Through this design, the system not only reduces the apparent issues, but also improves the overall dispatcher memory footprint and its run time cost.

Similarly, the innovative message dispatch service (messenger) of the system is designed to separate the messaging workflow from the messaging protocol implementation (stack). All the messaging protocol stacks are implemented as plug-and-play drivers, whereas the messaging workflow, which dictates how a messaging process executes, is implemented inside the messenger service as a messaging core. The core, depending upon the messenger type, can dynamically load and link one or more protocol drivers. These drivers implement the protocol stack that does all the protocol-specific communication and processing. The framework enables the system to have two or more drivers implementing same protocol, but one of them is developed with customization for a certain carrier. The knowledge of when to use which driver for message dispatch is all configurable.

The method taught by the present invention is set to run and/or executed on one or more computing devices. A computing device on which the present invention can run would be comprised of a CPU, hard disk drive, keyboard or other input means, monitor or other display means, CPU main memory or cloud memory, and a portion of main memory where the system resides and executes. Any general-purpose computer, tablet, smartphone, or equivalent device with an appropriate amount of storage space, display, and input is suitable for this purpose. Computer devices like this are well known in the art and are not pertinent to the invention.

In alternative embodiments, the method of the present invention can also be written or fixed in a number of different computer languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for secure delivery of messages over disparate networks with disparate protocols, the system comprising:
a server computer comprising program code stored in a memory and adapted to manage message delivery received from at least one accredited client computing device, the server computer having at least a plurality of special transmission control protocol (TCP) sockets allowing a plurality of persistent connections, the connections being adapted to deliver messages under different carrier protocols, using at least one of simple network paging protocol (SNPP), wireless control transfer protocol (WCTP), simple network management protocol (SMTP), common alerting protocol (CAP), and open air interface (OAI) carrier types protocols, and the connections being adapted to facilitate the sending of multiple messages within a single time-limited session; and
a plurality of fast database computers each comprising program code stored in a memory and adapted to store and provide data to other components of the system; wherein a plurality of text-to-speech output files are cached in the fast database, and wherein for each message a check is made if the message or its sub module are present in the converted format, and wherein, in cases it is available, the already converted file is used in lieu of sending the message to a text-to-speech engine;
wherein the server computer is adapted to facilitate voice type configurations, wherein for voice delivery a sequence of beeps is sent to the receiving end, and wherein after each beep the line is observed for silence, and if the recording stops, or the human finished their greeting, the message is played back.

2. The system of claim 1, wherein the message protocol delivers one message to multiple recipients as one message protocol transmission.

3. The system of claim 1, further comprising a meta information database MIDB comprising program code stored in a memory and adapted to allow queuing operations on at least the messages in transmission and previously transmitted within a certain period.

4. The system of claim 3, wherein the MIDB is optimized for multiple queue tasks performed concurrently, allowing scaling to very large peak message volumes, with less degradation of performance.

5. The system of claim 1 further comprising a plurality of software drivers comprising program code stored in a memory and adapted to support workflow type configurations, wherein at least a portion of the plurality of software drivers are made available as plug and play drivers, and further wherein at least a portion of the plurality of drivers are configured alone or jointly to meet a desired workflow as needed for a specific type of workflow delivery defines for a specific message or group of messages.

6. The system of claim 1, wherein the system keeps two independent databases, a first database being adapted to store and provide a job queue and a second database being adapted to store and provide a dispatch queue, and wherein whenever a job is send to the system, it is first queued in the job queue, and when it gets ready for dispatch, then it is moved from job queue to the dispatch queue, said job queue having two tables, and said dispatch queue having three tables, and wherein a job is then moving the data in the 2 tables (of job queue) to the 3 tables (of dispatch queue) is such a way that the job dispatcher module does not process the job whose move is in-progress, thus avoiding the need to table lock to lock down read access until the write on the tables get finished.

* * * * *